(12) United States Patent
Candelore

(10) Patent No.: US 10,057,641 B2
(45) Date of Patent: Aug. 21, 2018

(54) METHOD TO UPGRADE CONTENT ENCRYPTION

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1605 days.

(21) Appl. No.: 12/454,912

(22) Filed: May 26, 2009

(65) Prior Publication Data

US 2010/0246819 A1    Sep. 30, 2010

Related U.S. Application Data

(60) Provisional application No. 61/163,254, filed on Mar. 25, 2009.

(51) Int. Cl.
| | |
|---|---|
| H04L 9/08 | (2006.01) |
| H04N 21/443 | (2011.01) |
| H04N 21/418 | (2011.01) |
| H04N 21/81 | (2011.01) |

(52) U.S. Cl.
CPC ......... *H04N 21/443* (2013.01); *H04L 9/0822* (2013.01); *H04N 21/4181* (2013.01); *H04N 21/8186* (2013.01); *H04L 2209/60* (2013.01)

(58) Field of Classification Search
CPC .................................................. H04L 9/0822
USPC ....................................................... 380/201
See application file for complete search history.

(56) References Cited

U.S. PATENT DOCUMENTS

| | | | |
|---|---|---|---|
| 6,035,037 A | 3/2000 | Chaney | |
| 6,141,533 A * | 10/2000 | Wilson et al. | 455/11.1 |
| 6,594,361 B1 | 7/2003 | Chaney et al. | |
| 6,697,489 B1 | 2/2004 | Candelore | |
| 6,847,719 B1 * | 1/2005 | Ballard | 380/279 |
| 7,120,250 B2 | 10/2006 | Candelore | |
| 7,139,398 B2 | 11/2006 | Candelore et al. | |
| 7,286,667 B1 * | 10/2007 | Ryal | 380/200 |
| 7,350,082 B2 | 3/2008 | Candelore et al. | |
| 2001/0007128 A1 * | 7/2001 | Lambert et al. | 713/165 |
| 2002/0023209 A1 * | 2/2002 | Domstedt et al. | 713/160 |
| 2002/0150239 A1 * | 10/2002 | Carny et al. | 380/37 |
| 2003/0110378 A1 * | 6/2003 | Yamada et al. | 713/161 |
| 2003/0110382 A1 | 6/2003 | Leporini | |

(Continued)

FOREIGN PATENT DOCUMENTS

| | | |
|---|---|---|
| CN | 1404594 A | 3/2003 |
| CN | 1666523 | 9/2005 |

(Continued)

OTHER PUBLICATIONS

Japanese Office Action dated Apr. 21, 2014 and translation thereof.

(Continued)

*Primary Examiner* — Arvin Eskandarnia
(74) *Attorney, Agent, or Firm* — John L. Rogitz

(57) ABSTRACT

Generation of secret keys is carried out in a smartcard for use by a receiver device's main processor, or alternatively, decryption processing for selectively encrypted content is carried out in the smartcard itself in order to thwart hacking and pirating of protected video content. This abstract is not to be considered limiting, since other embodiments may deviate from the features described in this abstract.

21 Claims, 12 Drawing Sheets

(56) References Cited

U.S. PATENT DOCUMENTS

| | | | |
|---|---|---|---|
| 2004/0006698 A1* | 1/2004 | Apfelbaum | 713/182 |
| 2004/0086127 A1 | 5/2004 | Candelore | |
| 2004/0168052 A1* | 8/2004 | Clisham et al. | 713/153 |
| 2004/0181666 A1 | 9/2004 | Candelore | |
| 2004/0192426 A1* | 9/2004 | Masui et al. | 463/16 |
| 2005/0058291 A1 | 3/2005 | Candelore | |
| 2005/0102702 A1 | 5/2005 | Candelore et al. | |
| 2005/0192904 A1 | 9/2005 | Candelore | |
| 2006/0149963 A1* | 7/2006 | Lu et al. | 713/151 |
| 2006/0195704 A1* | 8/2006 | Cochran et al. | 713/193 |
| 2007/0140318 A1* | 6/2007 | Hellman | 375/130 |
| 2007/0217603 A1* | 9/2007 | Quinard | 380/42 |
| 2007/0258583 A1* | 11/2007 | Wajs | 380/42 |
| 2008/0212774 A1* | 9/2008 | Moors et al. | 380/201 |
| 2009/0097659 A1 | 4/2009 | Candelore | |
| 2009/0103471 A1 | 4/2009 | Candelore | |
| 2009/0122989 A1* | 5/2009 | Asnaashari et al. | 380/278 |
| 2009/0193252 A1* | 7/2009 | Wajs | 713/165 |
| 2009/0327697 A1 | 12/2009 | Liu | |

FOREIGN PATENT DOCUMENTS

| | | | |
|---|---|---|---|
| CN | 1729668 A | 2/2006 | |
| CN | 101166180 | 4/2008 | |
| JP | 2000507072 | 6/2000 | |
| JP | 2001251599 | 9/2001 | |
| JP | 2001251599 A | 9/2001 | |
| JP | 2002-330127 | 11/2002 | |
| JP | 2002330127 A | 11/2002 | |
| JP | 2003153227 | 5/2003 | |
| JP | 2003153227 A | 5/2003 | |
| JP | 2004-516729 | 6/2004 | |
| JP | 2004516729 A | 6/2004 | |
| JP | 2005-516559 | 6/2005 | |
| JP | 2005-516559 A | 6/2005 | |
| JP | 2005516559 A | 6/2005 | |
| JP | 2006128907 | 5/2006 | |
| JP | 2007-251913 | 9/2007 | |
| JP | 2007251913 A | 9/2007 | |
| JP | 2007-324896 A | 12/2007 | |
| JP | 2007324896 A | 12/2007 | |
| JP | 2009005406 A | 1/2009 | |
| WO | WO 00/46994 | 8/2000 | |
| WO | 2008/050697 A1 | 5/2008 | |
| WO | 2008050697 A1 | 5/2008 | |
| WO | 2010/111182 A2 | 9/2010 | |
| WO | 2010111182 A2 | 9/2010 | |

OTHER PUBLICATIONS

Japanese Office Action dated Sep. 30, 2013 in Japanese counterpart application P2012-502146.
Canadian Office Action for application 2,752,727 dated Apr. 28, 2014.
Chinese Office Action for related Chinese Application, dated Jun. 12, 2014.
Uchide, Japanese Office Action for JP2015-058646, dated Feb. 2, 2015.
Office Action for CN201080013933.4, dated Dec. 22, 2014.
Office Action, Corresponding Canadian Patent Application No. 2,752,727, dated Aug. 22, 2013, Received Sep. 12, 2013.

* cited by examiner

METHOD TO UPGRADE CONTENT ENCRYPTION

CROSS REFERENCE TO RELATED DOCUMENTS

This application is related to and claims priority benefit of U.S. Provisional Patent Application No. 61/163,254 filed Mar. 25, 2009, which is hereby incorporated herein by reference. This application is also related to U.S. Pat. No. 7,350,082 issued Mar. 25, 2008, U.S. Pat. No. 7,302,058 issued Nov. 27, 2007, U.S. Pat. No. 6,697,489 issued Feb. 24, 2004 and U.S. patent application Ser. No. 10/774,871 filed Feb. 9, 2004, Ser. No. 10/318,782 filed Dec. 13, 2002, Ser. No. 11/097,919 filed Apr. 1, 2005, Ser. No. 12/069,106 filed Feb. 7, 2008, and Ser. No. 12/195,660 filed Aug. 21, 2008, each of which is hereby incorporated by reference herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Smartcards are used by Conditional Access Systems (CAS) in pay-TV operations such a cable and satellite content delivery systems. Smartcards provide a secure means to process keys in receivers in those operations. Smartcards execute a key processing hierarchy that typically involves the decryption of slower changing periodic keys delivered using Entitlement Management Messages (EMMs) and encrypted under unique secret smartcard device keys. These periodic keys may then be used to decrypt faster changing content keys which are delivered using Entitlement Control Message (ECMs) when tuning to a program. The periodic keys delivered with EMMs are changed regularly, but on a relatively infrequent basis, e.g. monthly, weekly or even daily. Content keys are used to directly protect content.

Smartcards are subject to intense hacking attacks in order to obtain services for which the appropriate subscription fees have not been paid. There are predominantly four hacking techniques in common use. They are commonly referred to as cloning, three musketeering, wizarding, and droning. Briefly, with cloning, the identity of the smartcard (unit address, device keys and key processing algorithms) are replicated. The cloned card benefits from the subscription associated with the original subscriber of the smartcard. The CAS in the content delivery system delivers the periodic keys as normal to the cloned unit address.

In three musketeering, a hardware or software security flaw is exploited to elevate the subscription level in some way, e.g. increase the service tier, increase PPV credit, or delete PPV purchases. The periodic keys are delivered as normal to the unit address (whether or not it is cloned).

Wizarding is where either the periodic keys or even low level content keys are delivered out-of-band using a pirate network, phone or Internet. Content keys may be delivered in real-time or off-line. When delivered real-time, the pirates utilize a constant network connection, and the hackers calculate and provide a flow of content keys for each channel being hacked to each pirate receiver—this can be very resource intensive. To accomplish wizarding of content keys on a significant scale, the pirates may need a "server farm" to handle the traffic of key delivery. When delivered off-line, the keys may be delivered as a file to a pirate receiver which has recorded encrypted content. The pirate receiver applies the keys from the key file on playback of the recorded content. Pirates prefer to wizard at the periodic key level since it only requires intermittent manual input or connection to a network, and minimized overall hacker resources.

Droning is the hardware re-use of a circuit or part of a receiver, otherwise pirates have to replace the hardware. Pirates prefer to drone hardware, if possible, because it minimizes investment in specialized hacking hardware. Hacking can involve combinations of techniques. For example, a receiver may be reprogrammed (droned) and infused with an identity of a smartcard (cloning). A security flaw might allow more services to be obtained than that received by just a clone (three musketeering).

CAS vendors invest huge sums of money in research and development to secure smartcards from hacking. But likewise, due to the high return on investment and lack of any cost for the content, pirates can invest considerable sums to break the security of a smartcard. Satellite systems are especially vulnerable since the keys extracted can often be used by receivers located over an entire continent or large portion thereof. Hackers can find many people willing to pirate the satellite signal, and so there are economies of scale. Pirates can invest small fortunes to thoroughly reverse engineer and hack a smartcard because they know they will find enough customers for their pirate products. Since smartcard identities (unit address, device keys and key processing algorithms) have become expensive for hackers to obtain, due to the need for specialized IC and failure analysis tools, such as Focus Ion Beams (FIBs), evacuation and deposition chambers, etc. and specialists to run them, wizarding has become the preferred method of hacking. Wizarding does not expose the compromised smartcard identity as in the case of cloning. If a cloned identity is intercepted by the legal authorities, it can be shut-down causing the hackers to lose their considerable investment. But wizarding does require the pirate receivers to obtain the periodic keys through other means than the content delivery system. Ironically, the hackers often charge for this "key service". But, the cost is typically much lower than a legitimate subscription.

Periodic keys are often delivered slowly enough, e.g. once a day, week or month, that they can be input my hand by interacting with a pirate receiver's user interface. But many satellite receivers now have a telephone or Ethernet connection that permits the keys to be automatically downloaded from an offshore website that is outside the recipient device's legal jurisdiction making law enforcement difficult.

Hacking the satellite signal has been made easier by the advent of Free-to-Air (FTA) satellite receivers. These are often imported from overseas, sold and distributed by local satellite equipment dealers. They are designed to receive available unencrypted satellite signals, but after purchase by a customer, they may be reprogrammed to steal protected content from a pay-TV service. The FTA receiver can be made to download pirate software which will allow the inputting of periodic keys through various means—through manual input, through a network connection, or even through an attached USB drive. When tuned to a pay-TV service, the periodic keys are used to descramble pay-TV programs without paying the appropriate subscription fees. The FTA hardware has all the tuning and descrambling hardware to hack the pay-TV service similar to the legitimate installed base of receivers. These modifiable FTA receivers provide an endless supply of droning hardware for hackers. Moreover, the hackers don't need to design and supply them—the satellite equipment dealers openly sell them with apparent impunity.

CAS providers have focused on upgrading the security of smartcards so that the cards could not be hacked in any way. Keys would not leak—device, periodic or content, and the smartcards would not be three musketeer'ed or droned. Additionally, a new hardware-based content decryption algorithm, which is part of the host receiver and not in the card, could be introduced such that all the pirating using FTA receivers would be defeated. But such a massive hardware upgrade would require the replacement of all fielded receivers which would be costly and operationally difficult for satellite service providers to carry out in a short amount of time. Meanwhile, the continued use of pirate FTA receivers enabled through wizarding is costing the service providers and copyright owners many millions of dollars of revenue each year.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
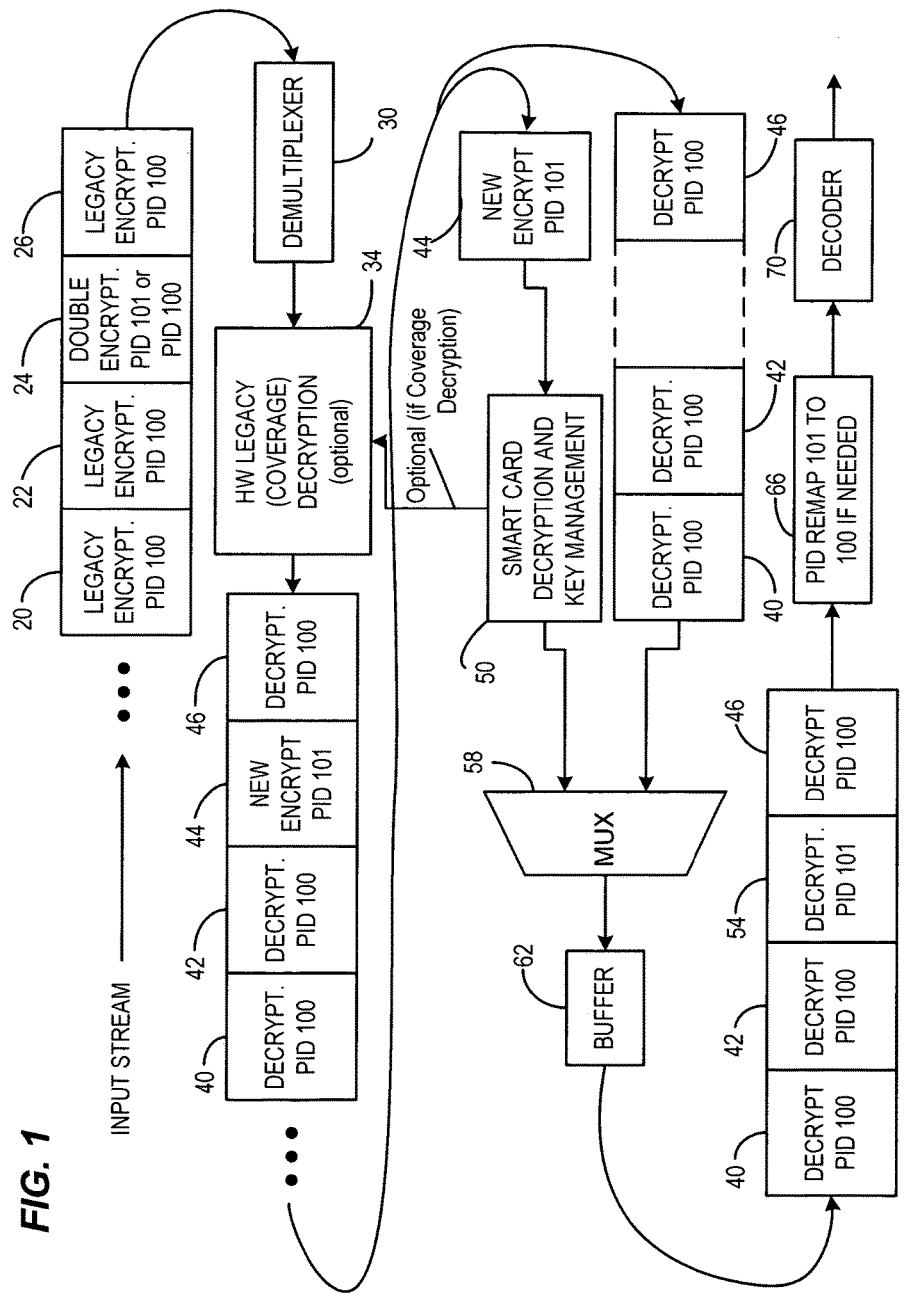
FIG. 1 is a block diagram depicting an example decryption arrangement consistent with legacy receivers with unified memory architecture (UMA) with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots, videos, Pay-per-view content, and other program-like content which may or may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "Unified Memory Architecture" (UMA) as used herein refers to a method that is generally used to lower cost and part count by allowing multiple logical and physical devices to share the same RAM or other memory block. Memory arbitration and priorities are used to resolve access between devices. UMA can allow devices to access each other's memory partition. UMA can be used to buffer content after tuning, demodulation, demultiplexing and decryption and to save content during different stages of content decoding. Some newer UMA architectures may seamlessly encrypt and decrypt bytes stored and retrieved from RAM to prevent hackers from physically probing the memory. It is anticipated that this RAM encryption will be transparent to the processing described herein.

"Periodic keys" are synonymous with "service keys". Keys usually change on approximately a monthly basis which corresponds with subscribers' subscription term. As a counter measure to wizarding, CA systems (CAS) can make the epoch more rapid, e.g. weekly, daily and in extreme cases (e.g., to minimize hacking of important paid events) hourly. There may be different levels of service keys that change at different rates. Periodic keys are usually sent using individual EMMs delivered to each smartcard. It is also possible for some periodic keys to be delivered using group EMMs.

"Content keys" are synonymous with the term "control words" as the term is used in certain CA encryption specifications. Content keys are conventionally used to directly decrypt content. In some CA systems, a counter mode is used with the content key. In this instance a counter value is used to derive the actual decryption key or keystream.

"Key value" is a term used in this disclosure that is very similar to "content key". This term is used to differentiate that it will be used with a proprietary software process executed for example by the receiver device's main CPU or other available processor in the receiver as opposed to a standard hardware decryption engine such as that which would appear in a legacy receiver box.

"Coverage key" is a term used in this disclosure which means that non-critical content is protected using standard hardware-based encryption using a common key sent to different receiver populations. Care should be taken to make sure that this key is not also used to encrypt critical content for which key separation is needed to make an effective anti-piracy measure unless provisions are made for handling double encryption. Since the hardware-based encryption methods are known and the key is sent to a hacked population of receivers, the coverage encryption is meant as a solution against reverse engineering attacks on selective encryption and to provide additional security in the case of content in which the content provider requires full encryption of some sort.

For purposes of this document, the term "double encryption" means that the same segment of content is encrypted twice (i.e., the encrypted segment is encrypted again, so that two decryptions are required to get to the clear content). The term "selective encryption" means that selected segments of content are encrypted either once or multiple times. The term "multiple selective encryption" means that a portion of content has been selected for encryption. This selected portion is duplicated to create multiple copies, which are encrypted in different ways. Other terms relating to this technology are used and defined in the above applications and their parents and lineage that are hereby incorporated by reference. In selective encryption, the term "critical" packets is used to describe packets that are selected for encryption, with "critical" not being an absolute term, but rather a term that is intended to convey that without such critical packets the proper viewing and enjoyment of the full content in its original form is impeded.

The term "Main CPU" is used to refer to the CPU or processor forming a part of the receiver box which may be executing the main software used in a receiver box (e.g., a satellite receiver box) to render on-screen displays (OSDs), handle tuning, and interact with smartcard. Interfacing with a smartcard is typically performed by using input and output "DMA mailboxes" that are defined in RAM where messages (and in our application, content) are loaded and exchanged using DMA engines. The CPU (or processor) is often built-in as part of an ASIC (Application Specific Integrated Circuit) which includes other functions such as transport demultiplexing and content decoding. The Main CPU can boot up from flash memory and, for speed reasons, executes from RAM. In the case of satellite receivers, it may be updated over-the-air. An embodiment of the invention may allow at least some of the software, e.g. part or all of the software decryption process discussed in more detail later, to be updatable by the smartcard. The RAM may be part of a unified memory architecture (UMA) used to lower part counts in a receiver and overall cost. The UMA allows the main CPU to access and manipulate content packets in RAM. The main CPU can execute a software decryption process on the encrypted content in RAM. Some ASICs may contain various processors which could be re-programmed to implement the embodiments described below. And so, it is not absolutely necessary for it to be the "main" processor in the receiver, only that it should have access to the encrypted packets in RAM, but for convenience, it will be referred to as the main processor or main CPU herein.

Smartcards generally resemble credit cards somewhat in size and form factor, but include different forms of memory, a programmed cryptographic processor, encryption accelerators, and proprietary hardware circuits. Modern smartcards may also employ an internal clock multiplier which can boost CPU and hardware processing power. Smartcards are user upgradeable through a user accessible interface. A customer can extract the old smartcard from the slot and replace it with a new smartcard (sent through the mail or courier). In pay-TV operations, smartcards are currently involved in processing the key hierarchy of the conditional access system (CAS) with the result of outputting content keys. These keys are used with hardware-based decryption in the host receiver. However, the processing power available in smartcards is not generally considered adequate to carry out extremely complex processing operations such as decryption of a complete stream of full motion video content, and thus has not been considered viable as an integral part of the decryption function except for processing content keys and periodic keys.

In accord with certain embodiments consistent with the invention, the involvement of smartcards in the video decryption process is changed in at least one of two significant ways. First, the smartcard can be allowed to decrypt selectively encrypted content diverted to it by the main CPU or by otherwise accessing unified memory. Second, and as an alternative, to generate a key value output (to differentiate from "content key" used with hardware based decryption) for use with a software decryption process executed by the main CPU. The content in the second method may or may not be selectively encrypted. In this manner, certain implementations result in accomplishing certain antipiracy goals: 1) to disrupt wizard key distribution by shutting it down or making it less convenient or more costly to the hacker and pirate, e.g. requiring a constant connection to a hacker website; and 2) invalidate or complicate FTA droning hardware which cannot do the new content descrambling provided by the new smartcard or main CPU content decryption algorithms. Various embodiments are disclosed and others will become apparent to those skilled in the art upon consideration of the present teachings.

In accordance with certain embodiments, a smartcard is used not only to manage the key hierarchy of a CAS, but to handle the low-level decryption of certain critical packets of content. If, for example, I-frame headers of an MPEG Transport Stream are encrypted, then this represents only 2×188 bytes for 376 bytes per second for a 15-frame Group of Pictures running at 30 frames per second. The entire I-frame header Transport Packet need not be encrypted. For example, it is possible to encrypt as few as 16 bytes of the I-frame header packet in order to significantly corrupt the entire I-frame header. That would represent only 32 bytes per second of encrypted content. This is possible because the new decryption process is managed in software in the receiver and also in the smartcard. A hardware decryption engine would typically decrypt the entire payload of a 188-byte Transport Stream packet. The exact bytes which are chosen for encryption can be a matter of CAS convention and signaled through the ECM, and may be static or dynamically changed. Non-critical packets may be left in the clear or as discussed later may be encrypted using a coverage key. The coverage key can be applied using legacy descrambling hardware prior to the content arriving in the RAM buffer—leaving only the critical packets fully or partially encrypted.

There is an implication for unified memory architecture (UMA) in that the main CPU is able to access the encrypted bytes of content that have been demultiplexed into a buffer in RAM. The firmware in a legitimate legacy receiver can be upgraded or reprogrammed in the field to send these encrypted bytes from the content buffer to the smartcard over the smartcard interface for decryption. The smartcard interface, although not explicitly shown in the drawings hereof but which will be understood to be present, may be based on ISO standard ISO7816 for example. It should be noted that the encrypted bytes may be encrypted again using a local key to ensure secure delivery over the interface to the smartcard. The scheme is helped if the interface is rapid. The RAM buffer may be optimized in order to send more bytes to the smartcard for decryption. For example, the buffer may be made larger to minimize main CPU interrupt overhead by aggregating packets for deliver over the interface.

In other implementations, the smartcard is used to output a key value to a software decryption process executed by the main CPU which bypasses the hardware-based encryption (which the pirate FTA receivers also have). The software based decryption is discussed in more detail later, but among other things can include content block decryption, keystream generation with a counter mode or with a keystream cipher, or use directly as a keystream, for example by EXOR'ing the key on bytes of encrypted content to carry out the decryption. This software based decryption can also use obfuscation techniques and self-check routines to make reverse engineering more difficult.

The content key is currently applied to a standard hardware scrambling algorithm like Digital Video Broadcasting (DVB) Common Scrambling Algorithm (CSA) or Digital Encryption Standard (DES) in the receiver. When the smartcard calculates the content key from the ECM, the smartcard may re-encrypt the content key for delivery over the link from the smartcard and the host. Referring to FIG. 1 of U.S. Pat. No. 6,697,489 "Method and Apparatus for Security Control Words", and FIG. 2 of U.S. Pat. No. 7,302,058 "Method and Apparatus for Security Control Words", the cryptographic processor 410 of the smartcard can encrypt the control word (content key) for secure delivery over the link. On the receiver side 401, the control word is decrypted directly into a key register of the descrambler. Since the second embodiment uses a replacement software decryption using the main CPU 430, descrambler IC 440 is bypassed and the descrambler 470 is not used. The main CPU 430 accesses the encrypted packets in unified memory (not shown). In the second embodiment, the local key stored in the Unique Descrambler IC Key Register 450 may or may not be used to secure the key value across the link because the key value or resultant decryption may not be accessible to the software process that will be executed by the main CPU 430. For the second example embodiment of the invention, the main CPU 430 uses the actual key. The key cannot be buried in a register of the hardware decryption engine. If the previous local key cannot be used, then a different local key can be generated and used that the main CPU 430 can use (and that will match that sent to the smartcard). Ideally, the local key would be unique per receiver.

In one embodiment, the smartcard does not use one of the standard content decryption algorithms such as DVB CSA or DES, but instead implements a secret, proprietary content decryption algorithm. The smartcard does not output a content key to the host receiver unless it is for coverage. Rather, the smartcard decrypts the selectively encrypted content directly. The decryption key used to decrypt this content will never leave the perimeter of the smartcard, rendering the key more difficult to ascertain. This, coupled with the fact that the algorithm is proprietary, renders the smartcard decryption quite secure.

Hackers can spend a lot of time, money and resources to break one smartcard. The hacked smartcard identity (unit address, devices keys and key processing algorithms) may then be used to try to calculate the periodic keys from EMMs outside the perimeter of the card. Proprietary algorithms, especially those based in hardware, can make this difficult unless the hackers can extract them from the smartcard as well. If not, then the hackers may use a smartcard as a calculator to compute the periodic keys. The periodic keys can then be delivered to pirate receivers, e.g. reprogrammed FTA receivers. As described earlier, this is known as a wizarding (using periodic keys). CAS vendors will make ECM processing more difficult for pirate receivers by using buried keys and proprietary algorithms in hardware to calculate the content key.

Often, a CAS vendor is stifled in what it can do because it often has to match the decryption key sent to legacy field receivers (using the same CAS). CAS vendors typically use the DVB Simulcrypt Standard to do this—where all the fielded receivers must calculate the same exact content key. The embodiments of the invention can enable a CAS vendor to completely break this paradigm. In all the scenarios discussed below (where legacy receivers without UMA are left in the field), the upgraded receivers accessing multiple selectively encrypted content can use different content keys. These keys can be generated by any means. They do not have to result in a deterministic key as required by the DVB SimulCrypt standard, for example.

Depending on how the CAS is designed, only one hacked smartcard may be needed. The pirates can then authorize the smartcard for all services. The smartcard can then be delivered EMMs that would allow it to calculate periodic keys that should open all services. Pirate users need only retrieve the periodic keys (that would have been sent to the hacked smartcard) from a pirate website once in a while. The keys can be obtained manually and input into the receiver using an on-screen display, or automatically from pirate websites, e.g. using a FTA receiver with an Ethernet or phone connection. The periodic keys may be good for days, weeks or an entire month and are often published within short periods of time of a change on the Internet. Hackers find it easier to redistribute the slow changing periodic keys and let the software modified FTA receiver calculate the content keys by processing the ECM if it can. Since the periodic keys are sent to a large group of legitimate receivers, it is nearly impossible learn which receiver leaked the keys. U.S. application 2009/0097659 "Method for Detection of a Hacked Decoder", which is incorporated by reference, describes a technique for using selective multiple encryption with a packet swapping process and clever grouping of receivers delivered different periodic and content keys for providing forensic key tracing capability. U.S. Pat. No. 7,350,082 describes a technique that uses selective multiple encryption with a packet swapping process to introduce a proprietary decryption algorithm which could invalidate drone hardware such as the FTA receivers. Using such techniques, even if the periodic or content key were known it would be tied to a hardware decryption algorithm for content that the pirates do not have. But such a technique usually requires the introduction of new legitimate receivers. In accord with embodiments consistent with the present invention, a technique to provide a solution for legacy receivers with unified memory architecture (UMA), downloaded software, and new smartcard is provided. The smartcard can be used for low-level decryption of content by involving the smartcard in the decryption itself or by having the smartcard output a key to a main CPU software decryption process which is described later. For legacy receivers with UMA, embodiments of the present invention can allow an anti-piracy function which may preclude the need to remove them from the field. It could save the CAS and service providers a great deal of money.

Assuming that the functions of the new smartcards cannot be successfully duplicated by the hackers, embodiments of the present invention may force the hackers to wizard by sending a content stream of clear content bytes (a new form of wizarding), key values, or keystream, thereby making hacking more difficult and expensive to the hackers. FTA receivers modified for piracy will need a continuous network connection. As described earlier, hacker data streams for each channel/program tuned will be needed. Hackers will need to continuously monitor each channel to supply the content, key values or keystream to their pirate receiver population. Hackers may focus on stealing just premium movie channels, e.g. HBO or Showtime, in order to minimize resources. Pirate websites will risk exposure subjecting it to possible shut-down by legal authorities. The numerous quickly changing content and key values will make any manual input impractical thereby shutting down a class of modified FTA receivers without some type of fast network connection. The changes suggested by embodiments consistent with the invention would have an immediate anti-piracy effect on those modified FTA receivers.

Access to content using UMA allows the main CPU to packet swap, if needed as described by U.S. Pat. No. 7,350,082, which is hereby incorporated by reference, and send encrypted content bytes to the smartcard for decryption and receive the decrypted content bytes back from the smartcard in one embodiment of the invention. In other embodiments of the invention, access to the content using UMA, allows the main CPU to apply a key value received from the smartcard in the following ways—for use as keystream, to use with a keystream generator, or use with block decryption (executed by the main CPU). These all bypass the hardware-based decryption devices and their associated decryption algorithms present in the receiver. The processing performed by the main CPU may be protected from tampering and reverse engineering by using obfuscation and self-checking techniques. Information and values obtained from the legitimate operating environment can be used to condition successful decryption of the content. This operation can be made more effective by use of multiple encryption. As mentioned above, the resultant key does not have to match a deterministic value as would be required under DVB SimulCrypt, for example.

The decryption of content by the smartcard was discussed above. In another implementation consistent with the present invention, the main CPU of the receiver device is used in the descrambling of content in the RAM buffer. In certain implementations, the main CPU can obtain a key value (as opposed to "content key") from the smartcard. Like previous content keys, the key value may be encrypted over the link using a local key for security purposes from the smartcard to the receiver. In a simple implementation, this key value may be EXOR'ed like keystream directly onto certain bytes of content. It may be used with a keystream generator to create a keystream. For example, the key value may be used to encrypt or decrypt a count value which could then be EXOR'ed directly onto encrypted bytes of content. Alternatively, the key value may be used with a type of easy to implement block encryption, e.g. similar to Advanced Encryption Standard (AES), which the main CPU can manage with available CPU cycles. One possibility is to reduce the number of rounds in AES encryption and modify the substitution tables. The changes to the AES algorithm may be kept secret creating a "secret algorithm". The decryption algorithm implemented by the main CPU may be partially or entirely obtained from the smartcard. Part or all of the processing may also be obtained through a software download to the receiver. While certain implementations may not use selective encryption, others may. Many variations are possible:

Some of the many possible scenarios envisioned are the following:

Non Critical and Critical: Legacy (UMA)

Scenario #1:

A service provider may have legacy receivers that all have unified memory architecture (UMA). Or, it may be possible for a service provider to take all receivers without UMA out of service leaving those only with UMA. In this situation, the CAS provider may wish to implement an embodiment of this invention where all of the legacy devices are upgraded to involve the smartcard in the descrambling. Content is selectively encrypted using the proprietary encryption. Critical bytes of critical packets can be encrypted using the new algorithm while leaving non-critical packets in-the-clear. The packets can all be received in RAM and stored in a buffer where the main CPU can access them. Prior to storing in RAM, the packets can be sent through the packet descrambler of the transport processor. This allows the legacy encryption to be used for coverage protection so that no clear packets are actually sent completely in the clear on the network. But this is not absolutely necessary since the selective encryption using the proprietary scrambling can be sufficient to protect the content. The extra encryption cannot hurt and is obtained at no additional cost since the typical architecture of receivers allows content to be descrambled before buffering in RAM. When transmitted with the coverage protection, the encrypted bytes can optionally be doubly encrypted—first with the proprietary encryption and second with the legacy encryption. No packet swapping is required in this scenario with all legacy receivers, however marking the encrypted packets with a different packet ID (PID) provides a convenient way to signal which packets are encrypted. And the packets need not be 100% encrypted with the proprietary encryption.

Non Critical: Clear—Critical: Legacy (No UMA), Legacy (UMA)

Scenario 2:

Unfortunately, a service provider may not have all legacy receivers with UMA, or may not be able to retire receivers without UMA. In this scenario, packet swapping as described by U.S. Pat. No. 7,350,082 can be used. The main CPU can accomplish packet swapping as well as the various aspects needed for the different embodiments of the invention, e.g. sending content to/from the smartcard, receiving a key value, and applying the key, generating a keystream or perform block decryption. In this scenario, content is selectively multiple encrypted. Critical packets are duplicated and encrypted two ways—once using the legacy encryption and the other using proprietary encryption involving the smartcard. As the first scenario, the packet with proprietary encryption need not be entirely encrypted. Certain critical bytes of that critical packet need to be encrypted. This can lessen the CPU cycle overhead for the smartcard or main CPU. It also can make delivery over the smartcard interface faster.

Non Critical: Clear—Critical: Legacy (No UMA), Legacy (UMA), New

Scenario #3:

Another scenario assumes that new receivers will be fielded while some of the legacy receivers are upgraded. In this scenario, there are legacy receivers with and without UMA, and there are new receivers with packet swapping and new proprietary algorithms built into the hardware. The scenario is very similar to the case above except that the critical packets are replicated three times instead of two times. The new receiver does not require manipulation of the content in UMA. In the future, in case of a security breach, it may allow such manipulation. However, it is assumed that hardware based decryption is superior. Again as described by U.S. Pat. No. 7,350,082 it can swap packets and descramble them on-the-fly like the legacy encryption in the legacy receivers.

Non-Critical: Clear—Critical: Legacy (UMA), New

Scenario #4:

If the service provider can eliminate receivers without UMA, then a scenario similar to #1 above may be possible. A coverage key may be possible as described by U.S. application Ser. No. 11/097,919, if both the legacy and new receivers can do packet swapping. The non-critical packets can be encrypted with a common coverage key which is sent to both legacy and non-legacy populations. The legacy receivers with upgraded smartcards can decrypt content sent with different Packet IDs (PIDs) than either the new receivers or the packets with non-critical content. New receivers would use hardware to packet swap and decrypt content while the legacy receivers would not. Even though both populations would be using upgraded smartcards, the CAS may not want have them share keys or low-level decryption algorithms.

These and other features will become apparent upon consideration of the following illustrative examples. However, it is worth noting prior to proceeding with the present examples that it is common to provide protection of secret or protected information including encrypted content, clear content, and decryption keys when passed over a user accessible interface, like a smartcard interface, by encrypting the information using local keys so that the encrypted or clear content and keys are not easily available to a hacker "in the clear". The local key encryption may itself use selective encryption. Before the information is used or further processed at the recipient site, it is decrypted to restore the original information. In the examples to follow, that process is presumed, but not described explicitly for clarity of the explanation. The modification of content or keys by encryption or decryption as described herein is different in that the modification is done in order to produce a more robust encryption, rather than for purposes of simply preventing easy interception of content or keys at a user accessible interface.

It will be noted that in many implementations consistent with embodiments of the invention, the receiver devices include hardware decryption engines that are either relegated to coverage decryption duties or else not used at all. While this may result in this portion of existing hardware being defeated, the result may be a more difficult system to hack and pirate than legacy hardware that has already been compromised.

Turning now to FIG. 1, it is noted that the use of smartcards is intended to thwart hackers that attempt to obtain access to content such as television programs and movies that are provided by service providers for a fee. But in some cases, smartcards have been compromised. Hackers are able to deliver periodic keys (wizarding) to modified FTA receiver (droning). The diagram of FIG. 1 provides a first example method for use of a smartcard to make the content more dependent upon the smartcard than has heretofore been utilized so as to make wizarding and droning more difficult. The detailed description below corresponds to Scenario #1 above.

In this embodiment, it is first assumed that the issue is dealing with a population of legacy receivers with UMA. It will also be appreciated by those skilled in the art upon consideration of the present teachings, that in all cases the illustrations and examples provided are simplified so as to illustrate the concepts involved and do not represent an exact hardware configuration. It will be further appreciated that variations, including variations in the order of certain operations can be made without departing from the concepts utilized to accomplish the objectives sought herein.

In this illustration, an input stream provides content segments such as packets that are encrypted using a coverage encryption process (i.e., an encryption process that prevents any content from appearing in the clear). In this example, a legacy encryption process (one in current use by the service provider) is used by way of example, but this is to be considered optional. In this case a segment of four units of content 20, 22, 24 and 26 are used for purposes of illustration. This segment can be part of a larger stream of content that has various parts identified by Packet Identifiers (PIDs) which are filtered based upon using program tuning information by a demultiplexer 30. In this example, packets 20, 22, 24 and 26 are each encrypted using the coverage encryption, and with the exception of packet 24, is identified by PID 100 by way of example. Packet 24, however, is selectively encrypted using a second encryption method (that is, this packet is double encrypted) and is identified by PID 101. In this example, the second encryption technique is referred to as the "new" encryption, because it will be new as compared to legacy encryption in common use and typically found in the drone receivers. It is not standardized or publicly published in any way.

The content packets 20, 22, 24 and 26 are identified to the receiver device (whose operation is depicted in FIG. 1) by any suitable mechanism including data supplied via a Program Map Table (PMT) or an Entitlement Control Message (ECM) or by predefined or variable rules devised by the service provider. It is possible that packet 24 has the same PID as packets 20, 22, and 26 if identified by convention, for example every I-frame header packet. Since each of the packets are encrypted using legacy coverage encryption in this example, they are passed to a hardware decrypter 34 that outputs a corresponding stream of packets 40, 42, 44 and 46 as shown. In this case, packets 20, 22 and 26 are decrypted to produce decrypted clear packets 40, 42 and 46, while packet 24 is decrypted to produce packet 44. Packets 40, 42 and 46 continue to bear PID 100, and packet 44 has now been decrypted and is clear with regard to the coverage encryption, but remains encrypted under the new encryption and continues to bear PID 101 in this example. (In other examples, the PID will be remapped later, and may be remapped at this stage or even earlier.) As mentioned above, this packet could bear the same PID as packets 40, 42, and 46. In such a case, ECMs or other provisioning can be utilized to convey to the receiver which packets, and bytes of packets in those packets if not 100%, are to arrive double encrypted so that the clearing of the encryption control bits that are manipulated during the first (coverage) decryption will not disrupt the ability of the receiver to recognized and properly handle the double encrypted packets (or bytes in those packets).

Packet 44 is selected according to any desired selection criterion that results in an increased difficulty in viewing the content (i.e., a critical packet). In one example, I-frame headers can be selected for encryption since this represents only a small, but important, part of the content for digital video (approximately 376 bytes per second in this example, of which not all bits need to be encrypted). Thus, to view the content, this packet which remains encrypted under the new encryption method is decrypted. Since the amount of content to be decrypted is relatively small compared to the overall content, it can be decrypted without using a large amount of computing resources. Hence, in accord with the present implementation, this selected content exemplified by packet 44 is conceptually diverted across the smartcard interface (not explicitly shown) to smartcard 50 where an internal cryptographic processor and/or other processing resources within the smartcard are utilized to decrypt packet 44. In a preferred embodiment, this is actually accomplished by storing the packets 40, 42, 44 and 46 into a unified memory that can be accessed by the receiver's main CPU (not explicitly shown). The main CPU then retrieves the encrypted (under new encryption) packet 44 and sends it to the smartcard where the smartcard decrypts it. The main CPU then receives it back from the smartcard, and returns the decrypted content to the unified memory for continued processing.

Functionally, the decrypted version of packet 44 (packet 54) is then combined with the already decrypted packets 40, 42 and 46 to produce a reconstructed stream at multiplexer 58 which may be buffered (e.g., in a buffer memory or a part of the unified memory) at buffer 62. Buffering may be needed due to the slower processing available at the smartcard 50. This results in a fully reconstructed unencrypted stream suitable for decoding for video presentation.

It is noted that the illustrated example depicts packet 54 as retaining PID 101 at this point, while the other packets in the stream are identified by PID 100. This can be corrected by remapping packets with PID 101 to PID 100 at PID remapper 66 for decoding by decoder 70 and/or sent to a disc drive (not shown). This may only be needed if the decoder 70 is only able to be set up for decoding video using a single PID. PID remapping is not necessary if the decoder can be configured to handle video data appearing with multiple PIDs for the same elementary stream of content. Also, in some embodiments, as mentioned above, it is not required for there to be a separate PID for this content. The content could be identified by convention or other signaling, e.g. an ECM. Additionally, PID remapping can take place at other locations in the process flow without limitation.

It is noted that in this example, coverage encryption is depicted, but need not be utilized. In such a case, the decrypter 34 and smartcard management thereof can be dispensed with or not used, providing the service provider and content owners are satisfied with the degree of protection that can be afforded using selective encryption within the decryption capabilities of the smartcard. However, coverage encryption may be desired where the service provider and/or the content owner has concerns about any portion of the content being available unencrypted. It is further noted that the processing power available within a smartcard will likely increase as time goes on rendering the amount of content that can be protected by encryption coupled with hardware dependence on the service provider's smartcard so as to enhance the available security and hacking difficulty.

In the above scenario, the security of the content is enhanced since the decryption process itself can be changed and embedded within a smartcard where a hacker will have greater difficulty determining how to hack the decryption.

Figure 2:
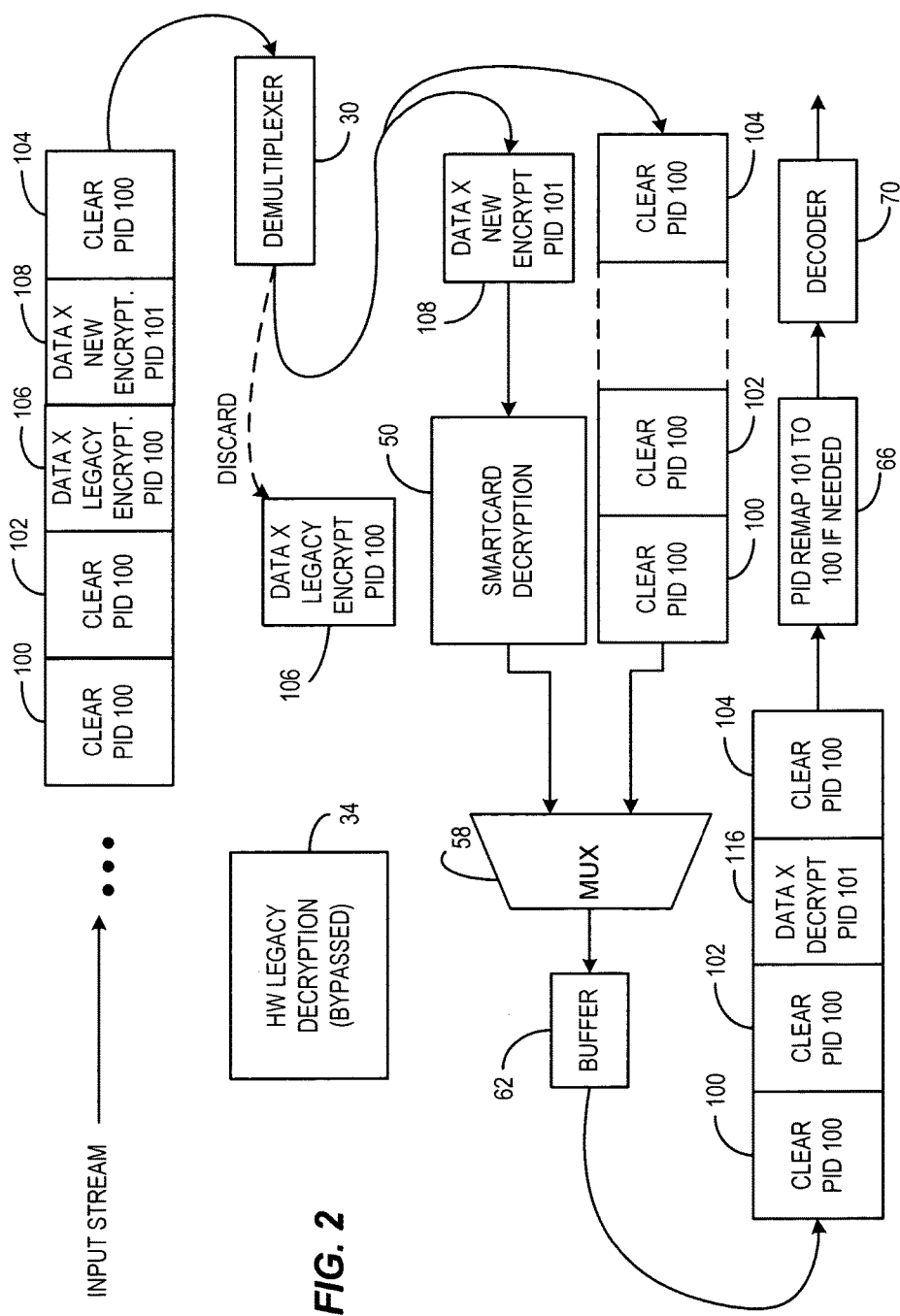
FIG. 2 a block diagram depicting an example decryption arrangement consistent with legacy receivers with and without UMA with certain embodiments of the present invention.

However, this does not deal with the issue of a current population of legacy receiver devices without UMA and their inherent legacy decryption limitations. A service provider may wish to upgrade the legacy receivers with do have UMA. At least this segment of the legacy population may be upgraded to more secure processing. This problem is discussed as Scenario #2 above and is addressed as illustrated in FIG. 2. In this example, the decryption system remains essentially the same, but receivers deploying the system can be gradually implemented as a separate population of receivers. In this case, the new receivers will operate in much the same way except that the content should not be coverage encrypted. This is because the CAS will not likely want to deliver a key for critical content which would cause the alternate key to no longer be needed for accessing the duplicate content. It defeats the purpose of managing separate receiver groups. The different receivers groups would not have key separation.

Content is multiple selectively encrypted. This is discussed in the U.S. Pat. No. 7,350,082 for example. The input data stream includes clear packets 100, 102, and 104 along with legacy encrypted data 106 and data encrypted using the new encryption 108. In this case, the clear packets 100, 102 and 104 along with the legacy encrypted packets may bear the same PID such as PID 100 as depicted. The new encryption packet 108 bears PID 101.

In such an environment, as will be seen later, the legacy receivers can continue to receive the content as before without being aware that the content is selectively encrypted (and may be subject to hacks). The encryption bits in the MPEG Transport Stream header can allow one packet to the next to be encrypted or not encrypted. Newly fielded receivers using the new encryption and packet swapping can also receive the content and properly decrypt the content. By this mechanism, the population of receivers that can be readily hacked can be reduced over time so as to ultimately field a set of receivers that are more robust in the face of hackers. This is further facilitated by withholding the keys derived from ECMs used by legacy devices without UMA from being usable by the population of receivers with UMA that are able to use the new encryption method. The receivers with UMA access different ECMs. The two different receiver populations use different periodic keys and different content keys. Enforcing this key separation can make for a good anti-piracy measure.

In the devices enabled for the new decryption method, the legacy encrypted packets for receivers without UMA such as 106 are simply discarded, for example at demultiplexer 30 using a packet swapping process discussed in the U.S. Pat. No. 7,350,082. Since this data are redundant with that of packet 101 (as indicated by use of the term "data X" for both packets). As in the previous implementation, the data with PID 101 and new encryption are passed to the smartcard 50 (again via unified memory in the preferred implementation) for decryption. The decrypted packet 116 is then recombined with the clear packets, conceptually at multiplexer 58 (which can be simply manipulation of the data in unified memory) and is buffered at 62. Again, if PID remapping is needed, it is carried out at 66 prior to decoding at 70.

It should be noted that the presently described process can be implemented immediately with existing smartcard-enabled devices having unified memory which can be accessed by the main CPU (not explicitly shown). In such cases, the legacy hardware decryption engine 34 is bypassed if not used for coverage decryption. The main CPU can be re-programmed to operate to permit "new" encryption packets to be manipulated as described by operation of the main CPU on packets stored in unified memory. Such upgrade can be carried out simultaneously with distribution of the smartcards and initiating a download of new firmware for the receiver either over the air or from data output from the smartcard. In any case, those without benefit of the latest smartcard cannot readily hack the new encryption and hence will be unable to receive unauthorized content. Those whose receivers have legacy hardware decrypters will only be able to operate if they are in a population that receives the legacy ECM and EMM messages, which can be gradually reduced by replacement of an aging population of receivers that do not have unified memory. This permits replacement of aging receivers in a more economically attractive manner.

Figure 3:
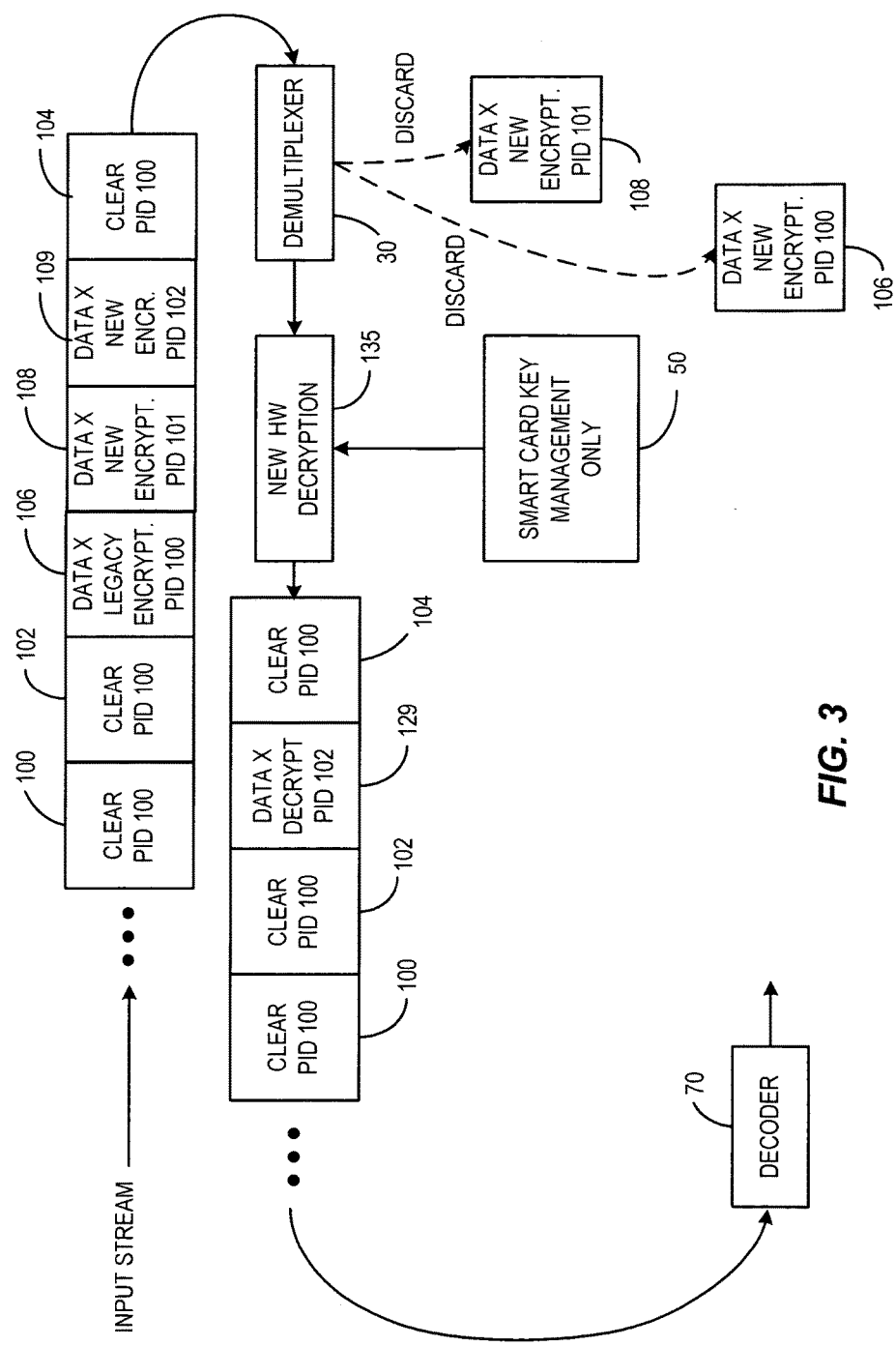
FIG. 3 a block diagram depicting an example decryption arrangement consistent with new receivers with or without UMA and new receivers with built-in packet swapping and algorithms in hardware with certain embodiments of the present invention.

However, this does not deal with the issue of a current population of legacy receiver devices with and without UMA while a service provider may wish to introduce new receivers. This problem is discussed as Scenario #3 above and is addressed as illustrated in FIG. 3. This situation is similar to FIG. 2 however it adds an additional duplicated packet 109 with Data X. All multiple encrypted packets deploy different encryption. Legacy receivers with UMA can benefit from an upgrade while the legacy receivers without UMA will be stuck with the legacy hardware-based decryption (which hackers can pirate). FIG. 3 illustrates the new receiver which can have new decryption algorithms implemented in hardware at 135 to operate on packet 109 to produce packet 129. Packet swapping can be built-in to the hardware. In this case, both of encrypted packets 106 and 108 are discarded at demultiplexer 30. This scheme works much the same way that a legacy receiver without UMA can be made to work for a transitional period as depicted in FIG. 4.

Figure 4:
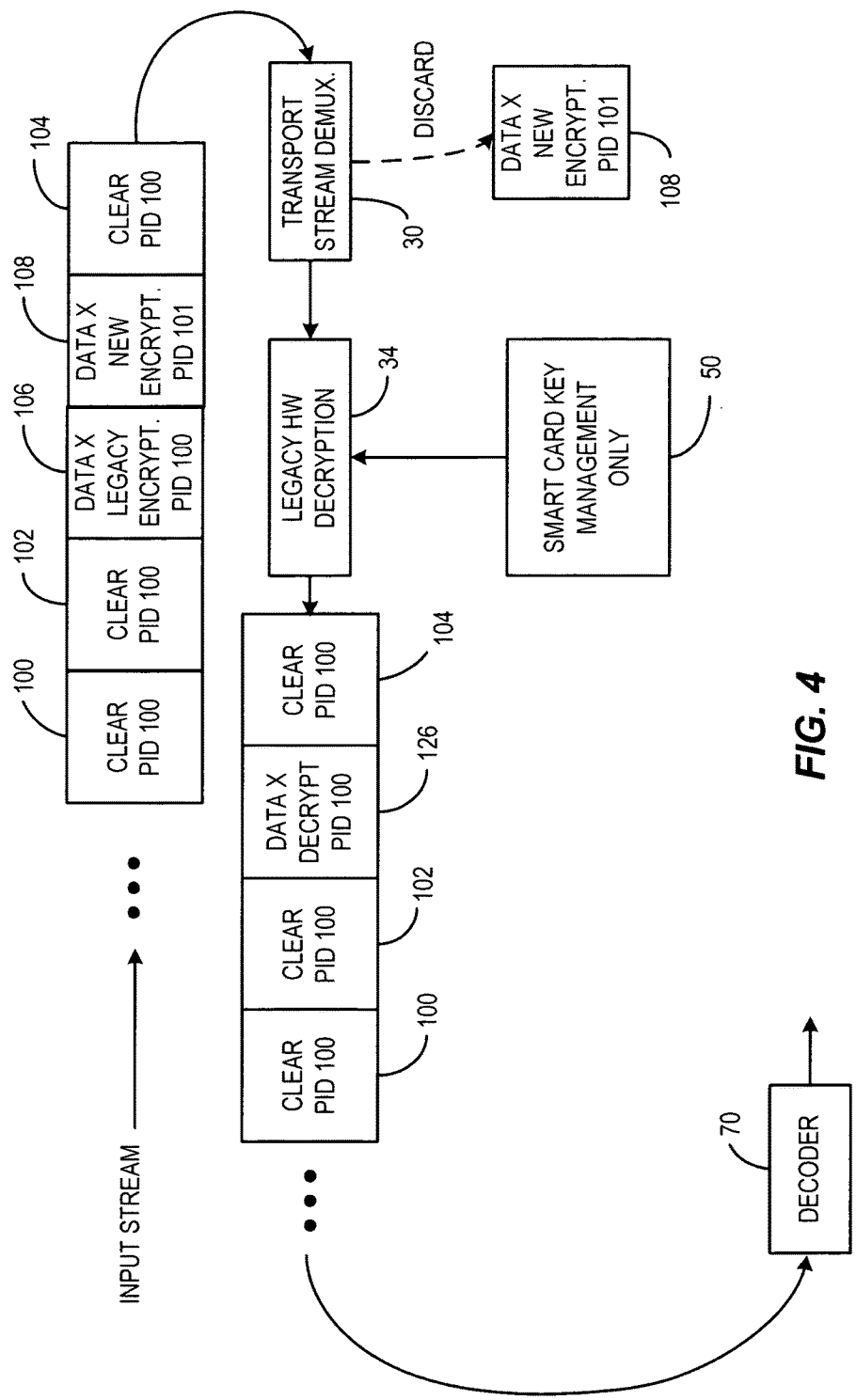
FIG. 4 a block diagram depicting an example decryption arrangement consistent with legacy receivers with UMA certain embodiments of the present invention.

FIG. 4 is used in Scenarios #2 and #3 above and depicts legacy receivers that are not upgraded. As before, receivers deploying the system can be gradually evolved as two separate populations of receivers—upgraded legacy with UMA and new receivers. The legacy without UMA would eventually be phased out or relegated to low-level tiers of service. Content is multiple selectively encrypted. The input data stream includes clear packets 100, 102, and 104 along with legacy encrypted data 106 and data encrypted using the new encryption 108. In this case, the clear packets 100, 102 and 104 along with the legacy encrypted packets may bear the same PID such as PID 100 as depicted. The new encryption packet 108 bears PID 101. Clear packets 100, 102 and 104 are passed through the system with packets using new encryption and PID 101 discarded. Legacy encrypted packet 106 is passed through the decrypter 34 and is decrypted to packet 126 in a normal manner to produce the output data stream for decoder 70. In such an environment, as will be seen later, the legacy receivers can continue to receive the content using packets with PID 100 as before without being aware that the content is selectively encrypted (and may be subject to hacks) while the newly fielded receivers using new encryption can also receive the content and properly decrypt the content. By this mechanism, the population of receivers that can be readily hacked can be reduced over time so as to ultimately field a set of receivers that are more robust in the face of hackers. The three different receiver populations would typically use different periodic keys and different content keys which are delivered using different EMMs and ECMs.

Figure 5:
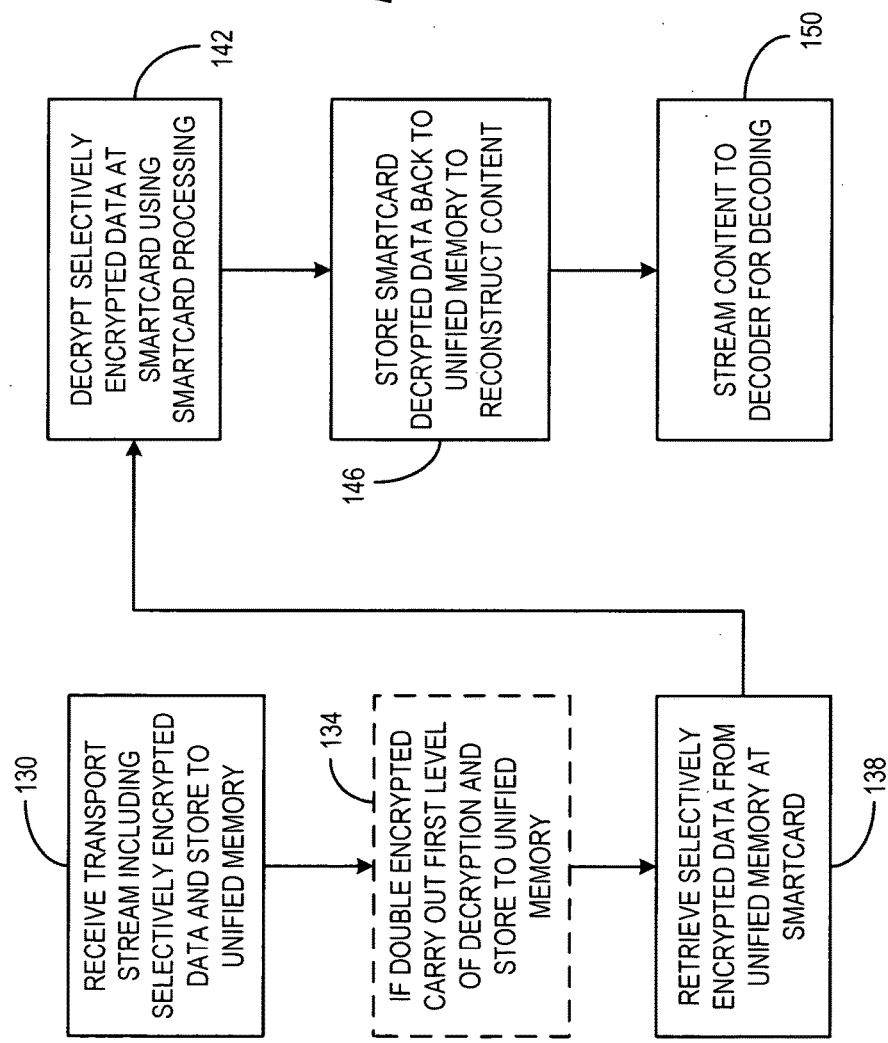
FIG. 5 is an example receiver process consistent legacy receivers with UMA with certain embodiments of the present invention.

With reference to FIG. 5, the total receiver side process depicted previously for use of the "new" encryption/decryption technique described is depicted generally in flow chart form wherein at 130; the transport stream carrying the selectively encrypted content data is received and stored to unified memory. If the content is encrypted using coverage encryption at 134, the first layer of double encrypted is handled by decryption to produce clear unencrypted content plus the content that remains encrypted under the new encryption method. This content is stored to unified memory so that the portions that remain encrypted can be retrieved at 138 by the smartcard and decrypted at 142 using the smartcard's internal coded decryption algorithm. It is noted that the decoding in the smartcard can be hardware or firmware/software based without departing from embodiments consistent with the present invention.

Once the smartcard completes decryption of the selected portions of content, those decrypted portions are stored back to the unified memory at 146 in a manner that reconstructs the original stream of content. This can be done directly by the smartcard, or can be managed by the receiver device's main CPU without limitation. Once the stream is reconstructed it can be buffered if need be and then streamed to the decoder at 150 for decoding with ultimate consumption by the viewer, or, recorded on a hard-disk drive for later consumption.

Figure 6:
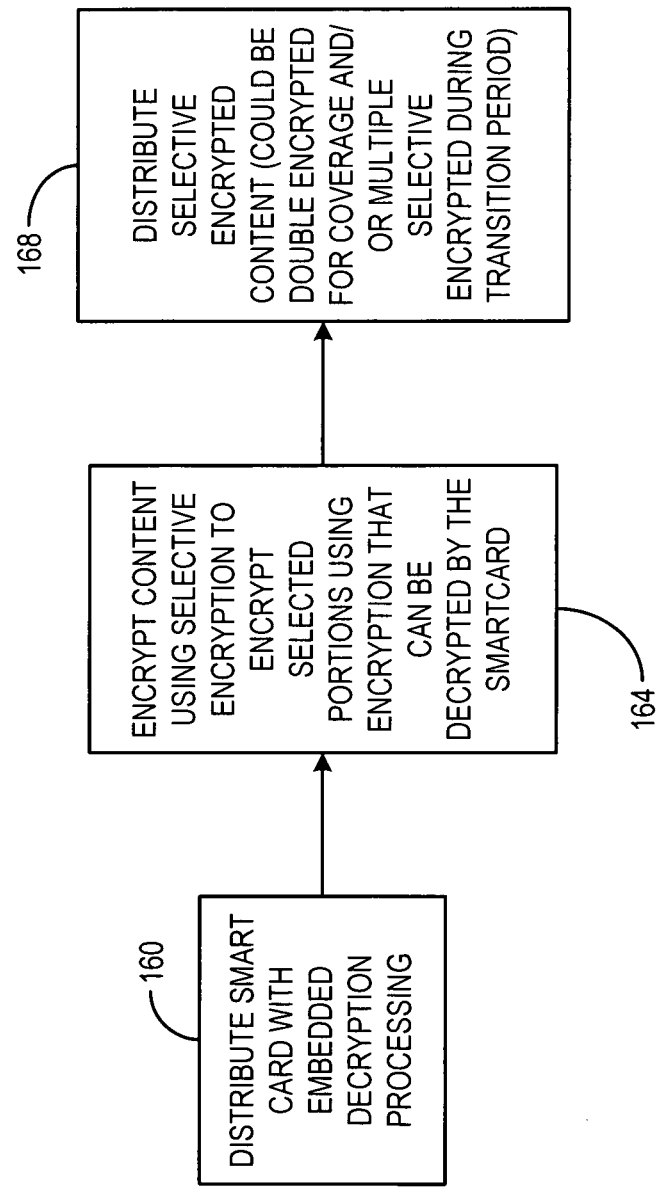
FIG. 6 is an example transmitter process consistent with certain embodiments of the present invention.

The process described is implemented by the service provider using the basic process as depicted in FIG. 6. In this process, new smartcards are distributed at 160 with the new smartcards being enabled with cryptographic processor and proprietary decryption algorithms in addition to that functionality for management of legacy keys and the like that are normally associated with a smartcard. Such capabilities can be implemented in hardware or firmware running on the smartcard processor (or combination thereof). Due to the processes used to manufacture and seal smartcards, these processes are well concealed from would-be hackers. The upgraded low level decryption algorithm may be better concealed using the smartcard then a software process executed by the main CPU. However, software obfuscation, integrity checking and self-checking routines can make reverse engineering software difficult. In other embodiments, the selected segments of content are also multiple encrypted. Each encryption can be independent of other encryption which makes also makes reverse engineering more difficult. Additionally, the very existence of decryption capabilities within the smartcard will not be readily apparent to such hackers until they discover that their normal reverse engineering to access decryption codes stored in the smartcards no longer appear to work.

As smartcards are introduced into the field, the content being distributed is selectively encrypted at 164 (and the selected segments are possibly double encrypted) in a manner such that the encrypted portions are no longer decryptable by legacy decryption but only by the functions provided on the smartcard, the content is distributed to a population of users at 168 which were given the appropriate periodic and content keys (or key values) where the selected segments are decrypted using the techniques discussed heretofore.

Figure 7:
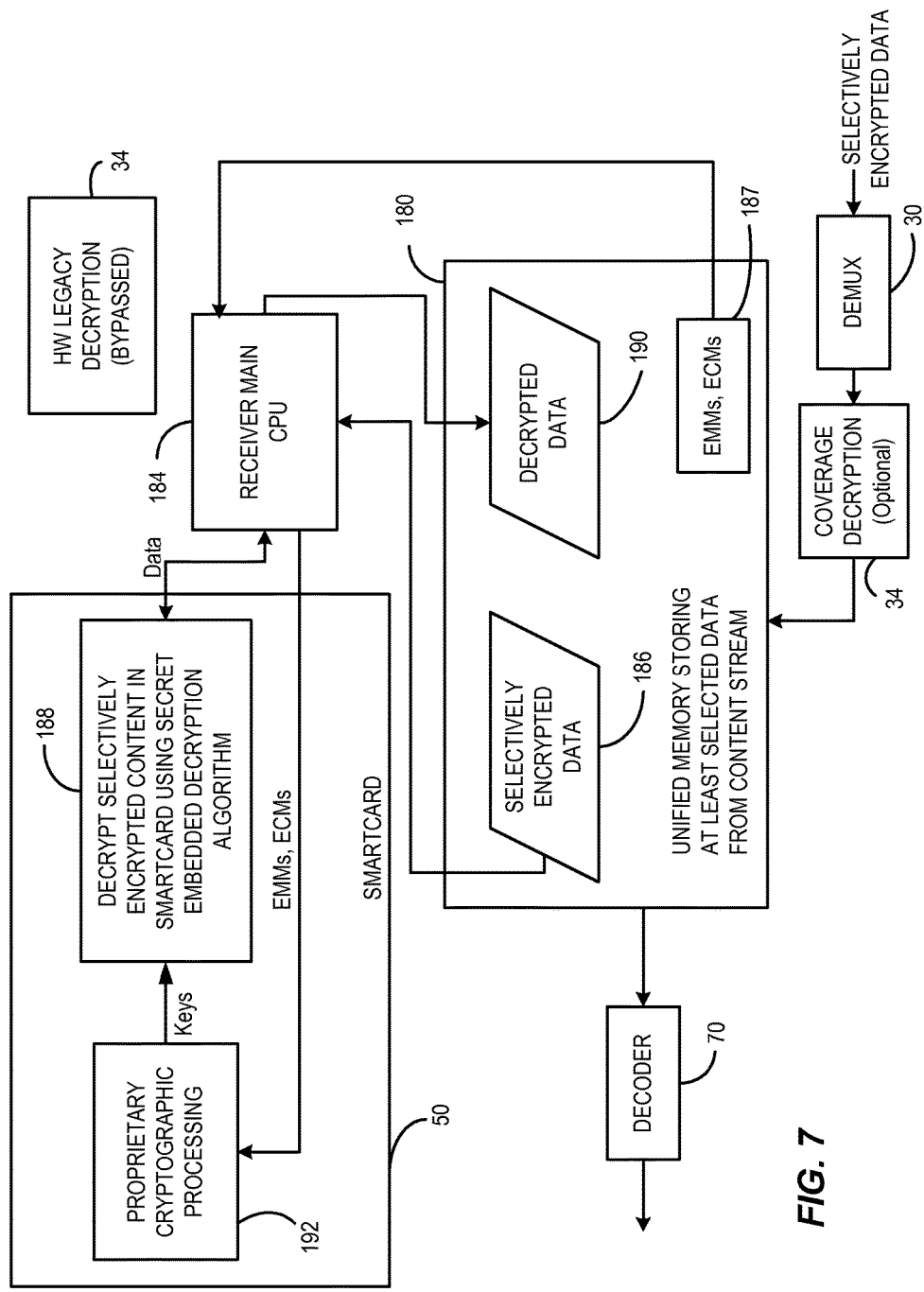
FIG. 7 is a block diagram depicting an example decryption arrangement consistent with certain embodiments of the present invention.

FIG. 7 shows a portion of an example receiver device according to embodiments consistent with the present invention wherein the smartcard 50 is interfaced to the receiver via the main CPU 184 to provide access to EMMs, ECMs 187 and selectively encrypted content 186 that have been stored in unified memory 180 by the demultiplexer 30 and, and in the case of content 186, optionally decrypted by a coverage key 34. The decrypted content 190 can be sent back to the receiver in a similar way. Unified memory in the receiver is therefore accessible to the detachable smartcard. The main CPU 184 involvement may be limited to setting up input and output data "DMA mailboxes" to/from the smartcard and formatting the data (not explicitly shown). For example, EMMs and ECMs that are received may be packaged within a message envelope that breaks-up the EMM and ECM data and sends this data to the smartcard in chunks. The same thing can be done with the encrypted content. As described before, the encrypted content sent to the smartcard may be optionally additionally encrypted by a local key (not explicitly shown). The encrypted content is similar to what may have been sent over-the-air but perhaps had been decrypted by an optional coverage key 34. By re-encrypting the encrypted content with a local key, a receiver can be prevented from aiding the hackers by allowing easy capture of the encrypted content at the smartcard interface. This prevents a hacker "tune and demux" function from being readily available. The local key can be applied by a process involving the main CPU and smartcard processor. The decrypted content sent back from the smartcard is protected by a local key as well (not explicitly shown). Similarly, the main CPU can decrypt the content using the local key. This unified memory 180 is therefore used as a parking place for incoming content packets that are being manipulated by one or more of the processes described including the smartcard decryption and possibly PID remapping if needed, again handled by the main CPU.

The encrypted data packets from the selectively encrypted data 186 stored in the unified memory 180 are retrieved by the smartcard processor where they are decrypted at 188 using a proprietary decryption algorithm and keys derived from EMM and ECM cryptographic processing 192 and returned, and merged back with the clear data as decrypted data 190 (via the main CPU 184). The security of the pay-TV operation is enhanced since the low level encryption of legacy receivers can be upgraded using the process discussed herein. Previously, the decryption was not seen as something that was upgradeable without a wholesale replacement of receivers in the field. In the preferred implementation, the smartcard can use any proprietary and secret method to process EMMs and ECMs 192 and decryption algorithm 196 to render the encrypted segments of content clear. The smartcard may be secured from tampering using all types of security measures including batteries, secrets and algorithms embedded in silicon, detection of passivation removal, probe sensors, etc. The smartcard must be insertable into the smartcard slot, but might have a slightly longer form factor which would make it stick out. It is possible to place components that would typically not fit in a typical smartcard slot on the part that sticks out of the slot.

In FIG. 7, ECM information is received from the CAS in-band with the content. In Satellite systems, the EMM is also sent in-band. While in cable systems, the EMM is sent out-of-band. The ECM and EMM data undergoes proprietary cryptographic processing at 192 to produce a new key that is then used in conjunction with a stored secret decryption algorithm to produce the decrypted data 190 that is passed to decoder 70. It is not an object of this invention to detail mechanisms used by the CAS to protect the smartcard from reverse engineering.

In this manner, the smartcard function must be fully replicated in order to hack the receiver as before using the periodic keys. Since the content decryption algorithm is not known or required to meet any particular standard, the algorithm can be changed as well as the decryption keys and key manipulation process. The encryption may be a block encryption algorithm or other suitable algorithm, and since the encryption algorithm is not known, hacking complexity increases since the hackers must figure out not only changing encryption keys (periodic and content), but also how the keys are being used. While this may not be an impossible task, at a minimum, it takes substantially longer than simply reverse engineering a decryption key and will cause would-be hackers to expend large amounts of time and expense to reverse engineer. When and if the process is compromised by an enterprising hacker, the smartcards can be replaced by the CAS vendor, but likely advantageously on a less frequent basis, thereby increasing cost to hackers and reducing the useful life of hacked receiver products. The use of selective encryption facilitates the ability to transfer encrypted content segment over the smartcard interface—a relatively slow serial link. The main CPU is still involved to format the messages, apply local key encryption, etc. and still so the number of bytes to process may still be an issue. Selective encryption therefore also minimizes the raw processing power that the main CPU must have. It minimize the raw processing power that a smartcard must have due to limitation in the size of die mounted in smartcards using micromodules and sent through the mail. However, smartcards can also be handled differently. As mentioned before, it is possible to make smartcards which stick out of the smartcard slot to accommodate larger dies and more robust types of IC packages as well as security features such as batteries. Also, with 16-bit and even 32-bit crypto processors, on-board clocks and clock multipliers and built-in acceleration circuits, a more powerful smartcard can be devised and deployed to handle more sophisticated decryption algorithms.

Figure 8:
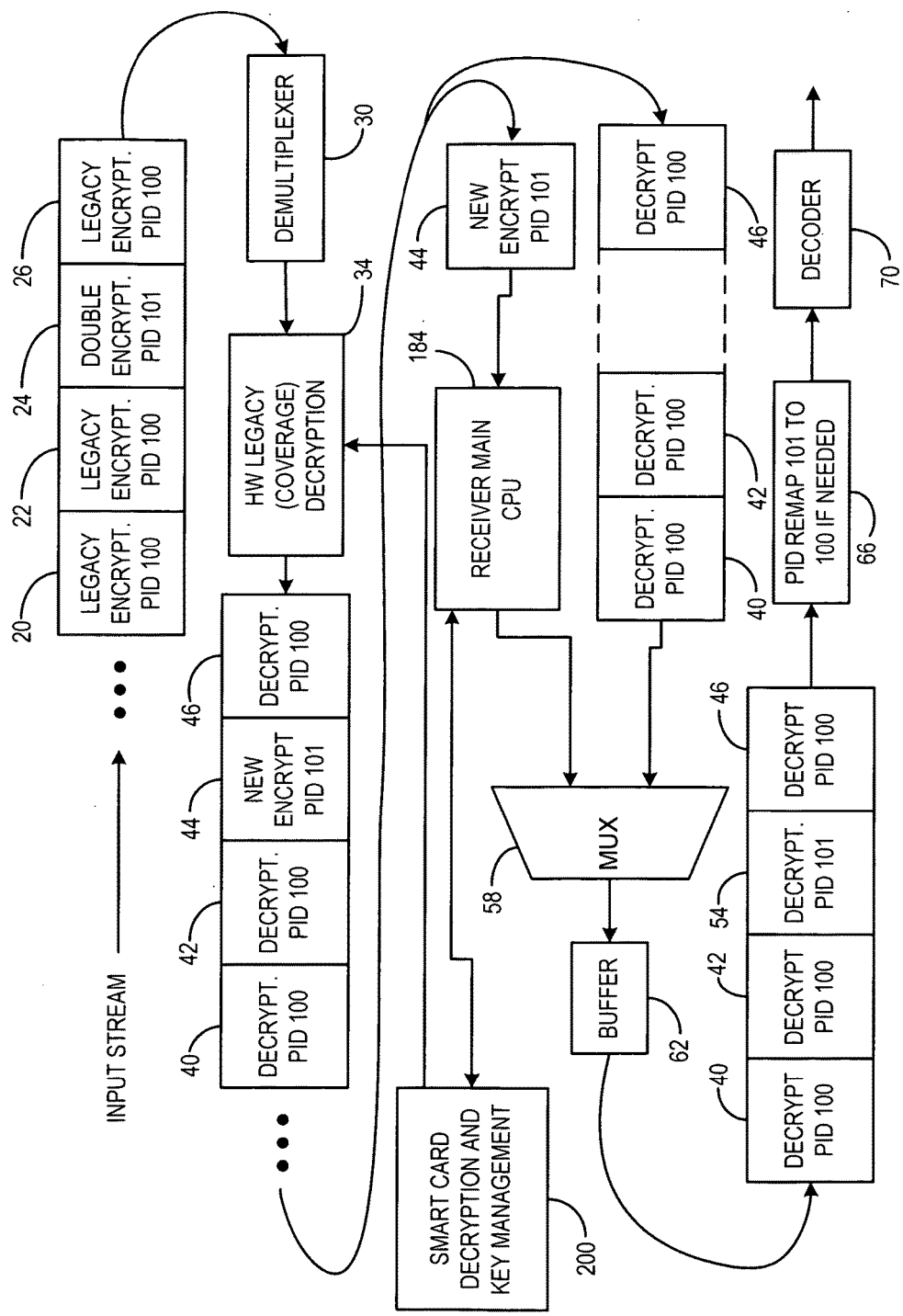
FIG. 8 is a block diagram depicting an example decryption arrangement consistent with certain embodiments of the present invention.

While the processing power of a conventional smartcard is adequate to provide the processing power used for the function described above, one can also utilize the processing power available to the receiver device to assist in thwarting hackers. FIG. 8 depicts another scenario that uses the processing power available in the smartcard 200 in conjunction with the main receiver processor 184 to carry out another decryption process. This scenario resembles that of FIG. 1, except that the actual decryption is carried out in a main receiver processor 184. Hence, most reference numerals correspond directly to the elements described in connection with FIG. 1. The smartcard can receive and processes EMMs and ECMs using secret and proprietary techniques as in the FIG. 1 case. The smartcard can output an optional content decryption key for optional coverage decryption 34. The smartcard 200 outputs a key value for use with a descrambling process executed by the receiver main CPU 184 software. The hardware decryption engine of the receiver is bypassed (except for coverage decryption 34). The key may be applied to any suitable function. This could again be applying the key as keystream, using a simple logic function such as a direct EXOR function on to encrypted bytes of content, or as a input to a keystream generator, e.g. encrypting or decrypting a count value (that may be sent as part of the same or different ECM) and applying that as keystream on the encrypted bytes of content, or with a block symmetric decryption of content or any other suitable algorithm. The software executed by the main CPU can be obfuscated for reverse engineering. It can be self checking so that if a hacker were to make a modification, this could be detected and cause the receiver to quit working. In this manner, the hacker cannot receive ECM messages and simply apply a hacked smartcard periodic key to get to the content, but must also decipher the key value and the content decryption algorithm. If pirating is still possible, it may force the hackers to wizard a low-level clear content or key values which will greatly increase the required hacker resources needed to perpetrate the piracy and might risk shut-down because of the constant and permanent nature of the network connection to all pirate receivers.

As with the prior illustration of FIG. 1, this implementation assumes an optional coverage encryption which can be the standard legacy encryption in one example. Content can be decrypted in hardware before reaching RAM, and so the legacy encryption can be obtained almost "for free". When used with the new encryption on selected bytes, the key epochs (changes) on the coverage encryption can be longer then if that encryption were used alone. For example, it might be possible to extend the coverage key epochs from 5 to 10 seconds to 6 minutes or more. This could greatly unburden the CAS delivery system for delivering update coverage keys. It is assumed that the appropriate messaging, EMMs and ECMS, will be delivered to manage the coverage encryption in addition to content decryption within the card. These can be using the same messages or different messages. But, this should not be considered limiting, since no legacy encryption could be used if desired.

Figure 9:
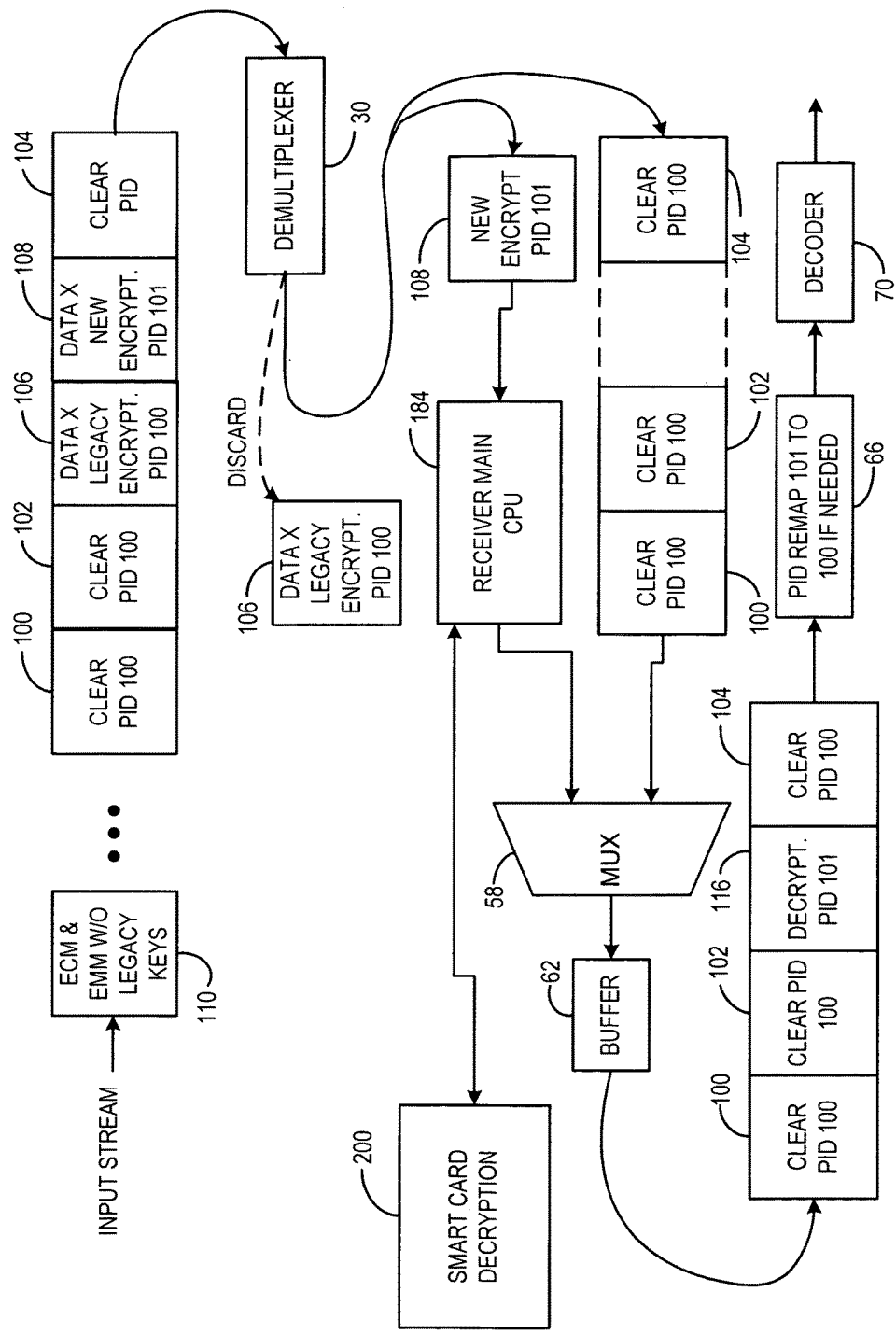
FIG. 9 a block diagram depicting an example decryption arrangement consistent with certain embodiments of the present invention.

Similarly, FIG. 9 depicts a solution while legacy receiver boxes are upgraded and new receivers are introduced. This process resembles that of FIG. 2 in that coverage encryption and double encryption are not used, but again decryption of the selected packets is carried out in the receiver main CPU 184 using key values derived by the smartcard 200. Again, smartcard 200 is utilized to derive keys from the ECMs and EMMs in a process that is hidden from potential hackers. The smartcard derives a key value sent to the main CPU 184. In addition, portion of the algorithm or the entire decryption algorithm may optionally be output by the smartcard 200 for execution by the main CPU 184. The algorithm data output from the smartcard may be bytes of executable binary or a script which is interpreted by the CPU to decrypt the content. Alternatively, the main CPU can receive the decryption algorithm through a software download.

Figure 10:
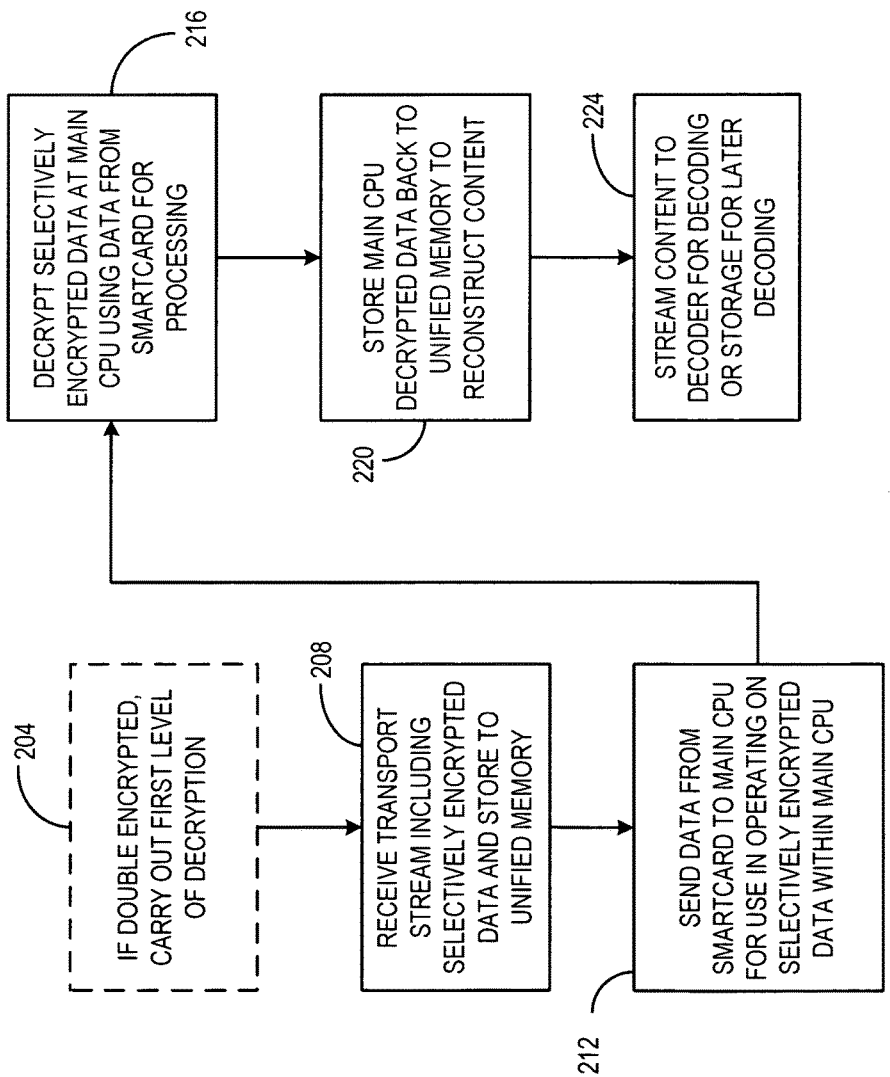
FIG. 10 a flow chart depicting an example receiver process consistent with certain embodiments of the present invention.

FIG. 10 depicts a process consistent with the solutions depicted in FIGS. 7-8. Content is received, if double encryption or coverage encryption has been carried out on the incoming stream, the first level of encryption is reversed in a decryption process of 204 and at least the resulting selected portion are stored in memory 208. At 212, data are sent from smartcard 200 to the main CPU for use in carrying out decryption of the content using main CPU software. The data sent from smartcard 200 includes at least content key information that is derived using an algorithm securely stored in the smartcard 200. The main CPU then decrypts the selected encrypted portions of content at 216 using this information from the smartcard. The main CPU then replaces the data into the memory at 220 and streams it at 224 to the decoder for decoding or storage for later decoding.

Figure 11:
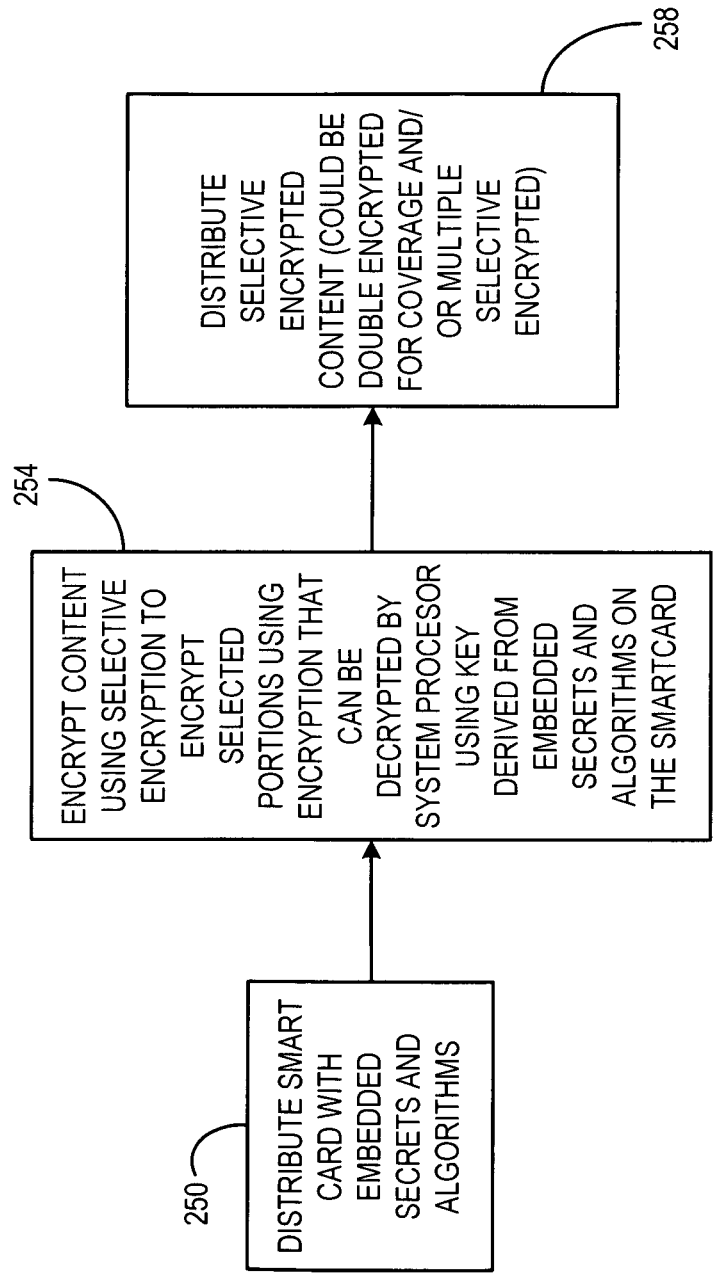
FIG. 11 is a flow chart depicting an example transmitter process consistent with certain embodiments of the present invention.

Turning now to FIG. 11, this figure shows a portion of an example transmitter with solutions depicted in FIGS. 8-9 according to embodiments consistent with the present invention wherein the smartcard is distributed 250 to upgrade the security of a CAS. Content is selectively encrypted using a key value that can be decrypted by the smartcard 200 and used by a software decryption process executed by the main CPU. The content may be coverage or double encrypted and then distributed at 258.

Figure 12:
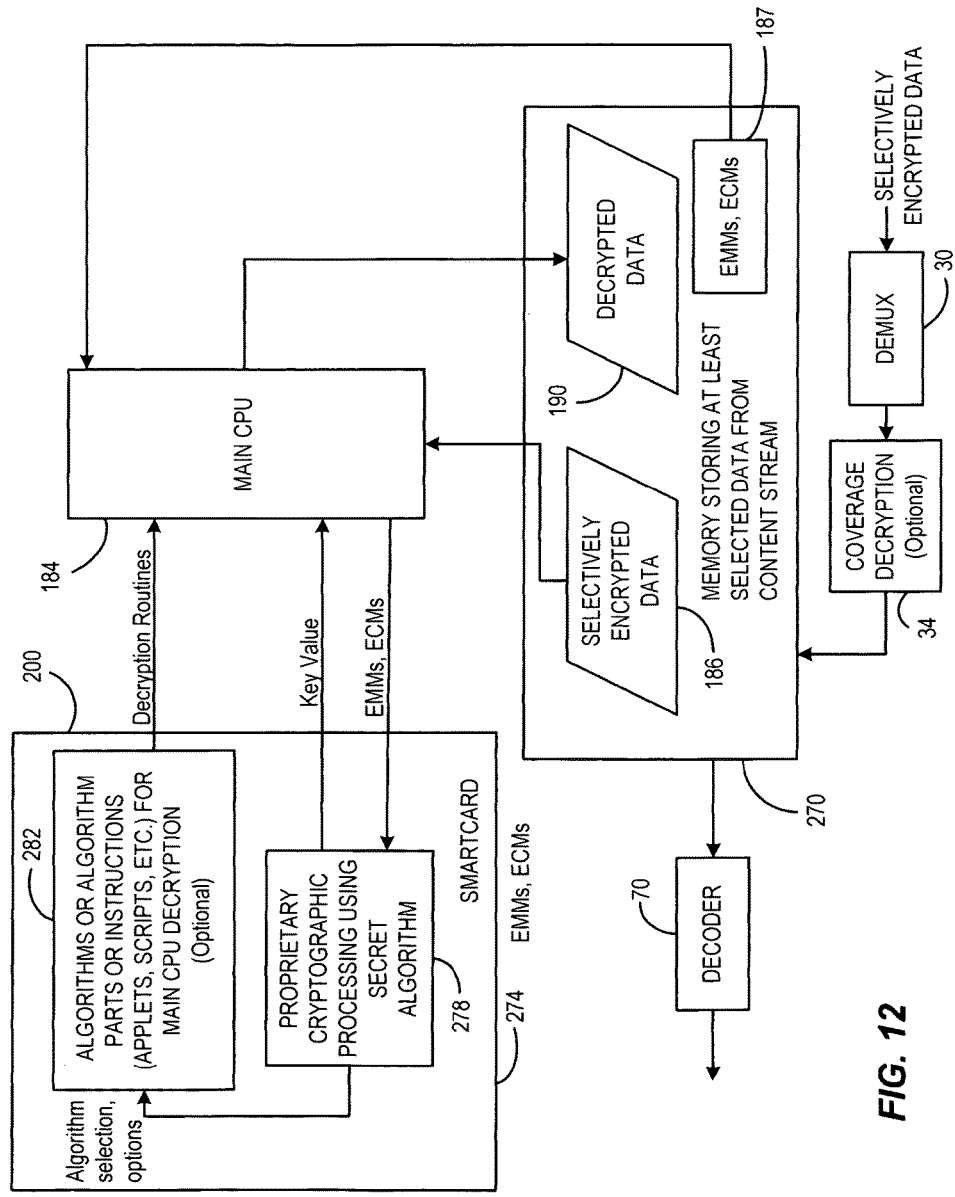
FIG. 12 a block diagram depicting an example decryption arrangement consistent with certain embodiments of the present invention.

Turning now to FIG. 12, this figure shows a portion of an example receiver device according to embodiments consistent with the present invention wherein the smartcard 200 is again interfaced to the receiver in a manner so as to receive EMMs and ECMs messages, which are demultiplexed at 30, and also to provide access to a block of memory 270. It is similar to FIG. 7, except that the main CPU 184 is involved with the decryption of content instead of the smartcard. This memory 270 is used to store incoming content packets that are being manipulated by one or more of the processes described including the main CPU decryption and possibly PID remapping if needed.

The encrypted packets from a selectively encrypted stream of packets 186 stored in the memory 270 are retrieved by the main CPU 184 where they are decrypted and returned as decrypted data 190. The security of the process is enhanced using this process by a number of factors. In the preferred implementation, one or more decryption keys received from the EMMs and ECMs which can be manipulated at 274 within the smartcard in accord with a secret algorithm 278 and used within the smartcard 200 by any suitable secret process to produce keys. As noted above, conventionally, ECMs typically deliver new content keys every 5-10 seconds; however, hackers took advantage of the fact that these keys are encrypted using keys with very long life—periodic keys—to achieve their goal. The hackers redistributed the periodic keys. It is believed that embodiments of the invention will drive hackers to wizard at a lower level and distribute either clear content segments, clear key values or content keys. The smartcard can optionally output parts of the decryption algorithm or the entire decryption algorithm 282. This could happen dynamically without the, need for a download of system software over-the-air. And so consequently, pirate wizarding at the low-level would need to distribute an algorithm as well. As mentioned before, the main CPU 184 can employ software obfuscation and self checking software. Pirates may also need to deliver parameters in which to allow pirate receivers to emulate the execution environment of the legitimate receivers.

ECM and EMM information is processed in at smartcard 200 at 274 to create a key value for use with the main CPU 184. In addition, some information may be used to optionally decode a new updated decryption algorithm which may be delivered to the main CPU over the smartcard interface (not explicitly shown). In this manner, the smartcard function must be fully replicated in order to hack the receiver. Since the algorithm for key generation is not known or required to meet any particular standard, the algorithm can be changed as well as the decryption keys and key manipulation process. Moreover, the smartcard can deliver changing algorithm parts as depicted by 282 to the main CPU for use in the decryption process. This approach is useful for especially slow smartcard interfaces where any encrypted segments of content sent over the interface would not be possible or where smartcards have not been enabled to decrypt content.

As was previously noted, it is common to provide protection of secret or protected information including decryption keys when passed from one hardware device to another by encrypting the information so that it is not available between modules or circuits "in the clear". However, before the information is used or further processed at the recipient site, it is decrypted to restore the original information. In the examples to follow, that process is presumed, but not described explicitly. The modification of content or keys by encryption or decryption as explained above is different in that the modification is done in order to produce a more robust encryption, rather than for purposes of simply preventing easy interception of content or keys between modules. That is, by way of further explanation and by way of example, when a key value is passed from 282 to 184 in FIG. 12, this key value is ultimately used to decrypt the content at 186 to produce decrypted data 190. This is reiterated to draw a distinction between additional encryption/decryption paired operations that can be interposed between, for example, 282 and 184, or between 184 and 190 to protect that content against direct availability between circuits at their interfaces.

Accordingly, in certain embodiments consistent with the present invention, generation of secret keys is carried out in a smartcard for use by a receiver device's main processor, or alternatively, decryption processing for selectively encrypted content is carried out in the smartcard itself in order to thwart hacking and pirating of protected video content.

Thus, in accordance with certain implementations, a decryption method involves at a video content receiver device, receiving a stream of digital video content which is selectively encrypted such that the digital video content contains a plurality of encrypted segments that are encrypted using a predetermined encryption method; storing the encrypted segments in a memory that is accessible by a processor forming part of the video content receiver device; sending the encrypted segments to a smartcard over a smartcard interface; at the smartcard, receiving the encrypted segments and decrypting the encrypted segments to produce decrypted segments; sending the decrypted segments back to the processor forming part of the video content receiver device over the smartcard interface; and storing the decrypted segments to the memory.

In certain implementations, the encrypted segments are sent over the user accessible interface, the processor forming part of the video content receiver device encrypts the encrypted segments using a local key and after reception by the smartcard, the encrypted segments are decrypted with the local key. In certain implementations, before sending the decrypted segments back to the processor forming part of the video content receiver device, the smartcard encrypts the decrypted segments with a local key and after reception by the processor forming part of the video content receiver device, the segments are decrypted with a local key. In certain implementations, the smartcard interface is based on the ISO 7816 standard. In certain implementations, the encrypted segments are part of one of a Transport Stream packet or an Internet Protocol (IP) packet. In certain implementations, the memory also stores non-encrypted segments and where the non-encrypted segments that are stored in memory are decrypted by a coverage decryption method. In certain implementations, the method also involves assembling the stream of video content with the decrypted segment replacing the encrypted segment in the memory. In certain implementations, the process also involves assembling the stream of video content with the decrypted segment replacing the encrypted segment in the memory. In certain implementations, the method also involves assembling the stream of video content with the decrypted segment replacing the encrypted segment in the memory. In certain implementations, the process also involves sending the reassembled stream to a decoder or recording the reassembled stream to a hard disk drive.

Another decryption method consistent with the present invention involves at a video content receiver device, receiving a stream of digital video content which is selectively multiple encrypted such that the digital video content contains a plurality of multiple encrypted segments that are encrypted using predetermined encryption methods; storing encrypted segments that use one of the predetermined encryption methods in a memory that is accessible by a by a processor forming part of the video content receiver device; sending the encrypted segments to a smartcard over a smartcard interface; at the smartcard, receiving the encrypted segments and decrypting the encrypted segments to produce decrypted segments; sending the decrypted segments back to the processor forming part of the video content receiver device over the smartcard interface; and storing the decrypted segments to the memory.

In another implementation, a decryption method involves at a video content receiver device, receiving a stream of digital video content which is selectively encrypted such that the digital video content contains a plurality of encrypted segments that are encrypted using a predetermined encryption method; storing the encrypted segments in a memory that is accessible by a processor forming part of the video content receiver device; at the processor forming part of the video content receiver device, receiving a key from a smartcard; the processor applying the key to decrypt the encrypted segments and bypassing a hardware decryption engine that comprises a part of the video content receiver device; and storing the decrypted segments to the memory.

In certain implementations, before the key is sent to the processor, the smartcard encrypts the key using a local key and after reception by the processor, the key is decrypted with the local key. In certain implementations, the memory is a unified memory further comprising assembling the stream of video content with the decrypted segment replacing the encrypted segment in the unified memory. In certain implementations, the method also involves sending the reassembled stream to one of a decoder for viewing or a hard disk drive for storing. In certain implementations, the method also involves the smartcard passing a portion of the decryption algorithm to the video content receiver device's processor. In certain implementations, the method further involves the smartcard passing the decryption algorithm to the video content receiver device's processor. In certain implementations, applying the key comprises applying the key as a keystream to the encrypted segments of content making the encrypted content clear. In certain implementations, applying the key comprises generating a keystream so that the keystream may be applied to more bytes of encrypted segments to render them clear. In certain implementations, applying the key comprises using the key with a symmetrical encryption algorithm which is executed by the processor to render the encrypted segments clear.

Another decryption method consistent with embodiments of the present invention involves at a video content receiver device, receiving a stream of digital video content which is selectively encrypted such that the digital video content contains a plurality of encrypted segments that are encrypted using a predetermined encryption method; storing at least the encrypted segments in a memory that is accessible by a processor forming part of the video content receiver device; at a smartcard having an internal processor, generating a content decryption key by applying an algorithm to an entitlement control message (ECM) as processed on the smartcard; passing the content decryption key to the video content receiver device's processor; bypassing a hardware decryption engine residing in the receiver device; at the receiver device's processor, in software decrypting the encrypted segments to produce decrypted segments; storing the decrypted segments to the memory; assembling the stream of video content with the decrypted segment replacing the encrypted segment in the unified memory; and sending the reassembled stream to a decoder.

In certain implementations a smartcard for use in a pay-TV receiver has smartcard housing cryptographic processing circuits. The smartcard cryptographic processing circuits receive encrypted segments of selectively encrypted video content in an external memory that is accessible by the smartcard. At the smartcard's internal cryptographic processing circuits, the encrypted segments are decrypted to produce decrypted segments that are stored to the external memory where they will replace encrypted segments to create a clear stream of video content.

In certain implementations, a smartcard for use in a pay-TV receiver the smartcard houses a cryptographic processor and memory. The smartcard processor generates a key value by applying an algorithm to an entitlement control message (ECM) as processed by the cryptographic processor on the smartcard. The smartcard passes the key value to a pay-TV receiver device's processor to carry out content decryption in software and bypassing a hardware decryption engine located in the pay-TV receiver.

Another decryption method consistent with certain embodiments involves at a video content receiver device, receiving a stream of digital video content which is multiple selectively encrypted such that the digital video content contains a plurality of multiple encrypted segments that are encrypted using multiple predetermined encryption methods; storing one of the encrypted segments using a predetermined encryption method and non-encrypted segments in a memory that is accessible by a processor forming part of the video content receiver device; at the processor forming a part of the video content receiver device, receiving a key value from a detachable smartcard; bypassing a hardware decryption engine in the video content receiver; the processor using the key value in a software process in one of the following ways: applying the key value as a keystream to the encrypted segments of content making them clear, generating a keystream so that the keystream may be applied to encrypted segments to render them clear, using the key with a symmetric encryption algorithm which is executed by the processor to render the encrypted segments clear, and storing the decrypted segments to the memory.

While certain illustrative embodiments have been described, it is evident that many alternatives, modifications, permutations and variations will become apparent to those skilled in the art in light of the foregoing description.

What is claimed is:

1. A decryption method, comprising:
at a video content receiver device, receiving a stream of digital video content which is selectively encrypted such that the digital video content contains a plurality of encrypted segments of the digital video content that are encrypted using a predetermined encryption method;
demultiplexing the digital video content to select the encrypted segments;
buffering the encrypted segments of the digital video content in a buffer memory that is accessible by a main processor forming part of the video content receiver device;
the main processor selecting the encrypted segments of the digital video content and sending the encrypted segments of the digital video content to a smartcard over a smartcard interface;
at the smartcard, receiving the encrypted segments of the digital video content and decrypting the encrypted segments of the digital video content to produce decrypted segments of the digital video content;
the main processor receiving the decrypted segments of the digital video content from the smartcard over the smartcard interface; and
the main processor storing the decrypted segments of the digital video content to the buffer memory, wherein before the encrypted segments of the digital video content are sent over the smartcard interface, the main processor forming part of the video content receiver device encrypts the encrypted segments of the digital video content using a local key and after reception by the smartcard, the encrypted segments of the digital video content are decrypted with the local key.

2. The method according to claim 1, wherein before the decrypted segments of the digital video content are received from the smartcard at the main processor forming part of the video content receiver device, the smartcard encrypts the decrypted segments of the digital video content with a local key and after reception by the processor forming part of the video content receiver device, the segments of the digital video content are decrypted with a local key.

3. The method according to claim 2, where the buffer memory part of a memory that also stores non-encrypted segments of the digital video content; and further comprising assembling the stream of video content with the decrypted segment of the digital video content replacing the encrypted segment of the digital video content in the memory.

4. The method according to claim 1, wherein the smartcard interface is based on the ISO 7816 standard.

5. The method according to claim 1, wherein the encrypted segments of the digital video content are part of one of a Transport Stream packet or an Internet Protocol (IP) packet.

6. The method according to claim 1, wherein the buffer memory is part of a memory that also stores non-encrypted segments of the digital video content and where the non-encrypted segments of the digital video content that are stored in memory are decrypted by a coverage decryption method.

7. The method according to claim 1, where the buffer memory part of a memory that also stores non-encrypted segments of the digital video content; and further comprising assembling the stream of video content with the decrypted segment of the digital video content replacing the encrypted segment of the digital video content in the memory.

8. The method according to claim 7, further comprising sending the reassembled stream to a decoder or recording the reassembled stream to a hard disk drive.

9. The method according to claim 1, where the buffer memory part of a memory that also stores non-encrypted segments of the digital video content; and further comprising assembling the stream of video content with the decrypted segment of the digital video content replacing the encrypted segment of the digital video content in the memory.

10. A decryption method, comprising:
at a video content receiver device, receiving a stream of digital video content which is selectively encrypted such that the digital video content contains a plurality of encrypted segments of the digital video content that are encrypted using a predetermined encryption method;
storing the encrypted segments of the digital video content in a memory that is accessible by a processor forming part of the video content receiver device;
at the processor forming part of the video content receiver device, receiving a decryption key from a smartcard;
at the smartcard passing at least a portion of the decryption algorithm that uses the key to carry out decryption of the encrypted segments of the digital video content to the video content receiver device's processor;
the processor applying the key to decrypt the encrypted segments of the digital video content using the decryption algorithm and bypassing a hardware decryption engine that comprises a part of the video content receiver device; and
storing the decrypted segments of the digital video content to the memory.

11. The method according to claim 10, wherein before the key is sent to the processor, the smartcard encrypts the key using a local key and after reception by the processor, the key is decrypted with the local key.

12. The method according to claim 10, where the memory comprises a unified memory further comprising assembling stream of video content with the decrypted segment of the digital video content replacing the encrypted segment of the digital video content in the unified memory.

13. The method according to claim 10, further comprising sending the reassembled stream to one of a decoder for viewing or a hard disk drive for storing.

14. The method according to claim 10, further comprising the smartcard passing an entire decryption algorithm to the video content receiver device's processor.

15. The method according to claim 10, wherein the applying the key comprises applying the key as a keystream to the encrypted segments of content making the encrypted content clear.

16. The method according to claim 10, wherein the applying the key comprises generating a keystream so that the keystream may be applied to more bytes of encrypted segments of the digital video content to render them clear.

17. The method according to claim 10, wherein the applying the key comprises using the key with a symmetrical encryption algorithm which is executed by the processor to render the encrypted segments of the digital video content clear.

18. A decryption method, comprising:
at a video content receiver device, receiving a stream of digital video content which is selectively encrypted such that the digital video content contains a plurality of encrypted segments of the digital video content that are encrypted using a predetermined encryption method;
storing at least the encrypted segments of the digital video content in a memory that is accessible by a processor forming part of the video content receiver device;
at a smartcard having an internal processor, generating a content decryption key by applying an algorithm to an entitlement control message (ECM) as processed on the smartcard;
at the smartcard passing at least a portion of the decryption algorithm that uses the content decryption key to carry out decryption of the encrypted segments of the digital video content to the video content receiver device's processor;
passing the content decryption key to the video content receiver device's processor;
bypassing a hardware decryption engine residing in the receiver device; at the receiver device's processor, in software decrypting the encrypted segments of the digital video content to produce decrypted segments of the digital video content;
storing the decrypted segments of the digital video content to the memory;
assembling the stream of video content with the decrypted segment of the digital video content replacing the encrypted segment of the digital video content in the unified memory; and sending the reassembled stream to a decoder.

19. A smartcard for use in a pay-TV receiver, comprising:
a smartcard housing cryptographic processing circuits;
the smartcard cryptographic processing circuits being configured to receive encrypted segments of selectively encrypted video content via a smartcard interface;
where at the smartcard's internal cryptographic processing circuits are configured to decrypt the encrypted segments of the digital video content to produce decrypted segments to replace encrypted segments of the digital video content to thereby create a clear stream of digital video content; and
the smartcard being further configured to send at least a portion of a decryption algorithm and a decryption key for use in decryption by the decryption algorithm to a processor via the smartcard interface.

20. A smartcard for use in a pay-TV receiver, comprising:
a smartcard housing a cryptographic processor and memory;
the smartcard processor generating a key value by applying an algorithm to an entitlement control message (ECM) as processed by the cryptographic processor on the smartcard;
the smartcard passing at least a portion of the decryption algorithm that uses the content decryption key to carry out decryption of encrypted segments of digital video content to the pay-TV receiver device's processor; and the smartcard passing the key value to a pay-TV receiver device's processor to carry out content decryption in software and bypassing a hardware decryption engine located in the pay-TV receiver.

21. A decryption method, comprising:

at a video content receiver device, receiving a stream of digital video content which is multiple selectively encrypted such that the digital video content contains a plurality of multiple encrypted segments of the digital video content that are encrypted using multiple predetermined encryption methods;

storing one of the encrypted segments of the digital video content using a predetermined encryption method and non-encrypted segments of the digital video content in a memory that is accessible by a processor forming part of the video content receiver device;

at the processor forming a part of the video content receiver device, receiving a key value from a detachable smartcard;

the smartcard passing at least a portion of a decryption algorithm that uses the key value to carry out decryption of the encrypted segments of the digital video content to the processor forming part of the video content receiver device, thereby bypassing a hardware decryption engine in the video content receiver;

the processor using the key value in a software process in one of the following ways: applying the key value as a keystream to the encrypted segments of digital video content making them clear, generating a keystream so that the keystream may be applied to encrypted segments of the digital video content to render them clear, using the key with a symmetric encryption algorithm which is executed by the processor to render the encrypted segments of the digital video content clear, and storing the decrypted segments of the digital video content to the memory.

* * * * *